US012588073B2

(12) United States Patent
Guo et al.

(10) Patent No.: US 12,588,073 B2
(45) Date of Patent: Mar. 24, 2026

(54) PHYSICAL RANDOM ACCESS CHANNEL ENHANCEMENT FOR INTER-CELL MULTIPLE TRANSMISSION AND RECEPTION POINT

(71) Applicant: QUALCOMM Incorporated, San Diego, CA (US)

(72) Inventors: Shaozhen Guo, Beijing (CN); Mostafa Khoshnevisan, San Diego, CA (US); Jing Sun, San Diego, CA (US); Xiaoxia Zhang, San Diego, CA (US); Yan Zhou, San Diego, CA (US); Tao Luo, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 19/009,108

(22) Filed: Jan. 3, 2025

(65) Prior Publication Data

US 2025/0142633 A1 May 1, 2025

Related U.S. Application Data

(63) Continuation of application No. PCT/CN2022/109846, filed on Aug. 3, 2022.

(51) Int. Cl.
| | |
|---|---|
| *H04W 74/0833* | (2024.01) |
| *H04W 56/00* | (2009.01) |
| *H04W 74/00* | (2009.01) |

(52) U.S. Cl.
CPC ... *H04W 74/0833* (2013.01); *H04W 56/0045* (2013.01); *H04W 74/006* (2013.01)

(58) Field of Classification Search
CPC ......... H04W 74/0833; H04W 56/0045; H04W 74/006
See application file for complete search history.

(56) References Cited

U.S. PATENT DOCUMENTS

2014/0198773 A1* 7/2014 Yin ................... H04W 56/0045
370/336
2015/0358138 A1* 12/2015 Hwang ............... H04W 74/004
370/280

(Continued)

FOREIGN PATENT DOCUMENTS

CN         111165016 A     5/2020
WO     2020215108 A2    10/2020

OTHER PUBLICATIONS

Futurewei: "Enhancements to Support Two TAs for Multi-DCI", 3GPP TSG RAN WG1 Meeting #109-e, R1-2203062, May 9-20, 2022, 10 Pages, The Whole Document.

(Continued)

*Primary Examiner* — Siren Wei
(74) *Attorney, Agent, or Firm* — Patterson + Sheridan, LLP; Randol W. Read

(57) ABSTRACT

Certain aspects of the present disclosure provide a method for wireless communication by a user equipment (UE) generally including receiving signaling indicating a set of physical random access channel (PRACH) configurations, receiving, a physical downlink control channel (PDCCH) order to trigger a PRACH transmission associated with an additional PCI different from a first PCI associated with a serving cell, transmitting a PRACH associated with the additional PCI based on one PRACH configuration of the set of PRACH configurations that is associated with the additional PCI, receiving an indication of a timing advance (TA) associated with the additional PCI, and applying the TA for an uplink transmission associated with the additional PCI.

20 Claims, 18 Drawing Sheets

(56)  References Cited

U.S. PATENT DOCUMENTS

| | | | |
|---|---|---|---|
| 2017/0111876 A1 | 4/2017 | Seo et al. | |
| 2017/0280481 A1* | 9/2017 | Stern-Berkowitz | .......................... H04W 74/0833 |
| 2019/0052334 A1* | 2/2019 | Jeon | .................. H04W 56/0005 |
| 2020/0029292 A1 | 1/2020 | Zou et al. | |
| 2020/0229237 A1* | 7/2020 | Kim | .................. H04W 74/0833 |
| 2020/0314721 A1 | 10/2020 | Cheng et al. | |
| 2020/0350977 A1 | 11/2020 | Ryu et al. | |
| 2021/0195547 A1 | 6/2021 | Pezeshki et al. | |
| 2022/0210825 A1* | 6/2022 | Zhu | .................. H04W 74/0833 |
| 2023/0239823 A1* | 7/2023 | Liu | .................. H04W 56/0045 370/350 |
| 2024/0187161 A1* | 6/2024 | Kurita | ............... H04W 72/1273 |
| 2025/0016846 A1* | 1/2025 | Kung | .................... H04W 74/04 |
| 2025/0039817 A1 | 1/2025 | Cirik et al. | |
| 2025/0185070 A1 | 6/2025 | Guo et al. | |

OTHER PUBLICATIONS

International Search Report and Written Opinion—PCT/CN2022/109846—ISA/EPO—Dec. 22, 2022.

International Search Report and Written Opinion—PCT/CN2022/109853—ISA/EPO—Dec. 20, 2022.

Nokia (Moderator): "Moderator Summary for LS reply to RAN2 on inter-cell Beam Management and multi-TRP in Rel-17", 3GPP TSG RAN WG1 #106bis-e, R1-2110630, Oct. 11-19, 2021, 22 Pages, pp. 10, 14.

OPPO: "Discussion on LS on inter-cell Beam Management and Multi-TRP in Rel-17", 3GPP TSG RAN WG1 #106bis-e, R1-2109049, Oct. 11-19, 2021, 7 Pages, The Whole Document.

ZTE (Moderator): "Summary of Preparation Phase Email Discussion for Rel-17 SDT", 3GPP TSG-RAN WG1 Meeting #109-e, R1-2205109, May 9-20, 2022, 6 Pages, The Whole Document.

* cited by examiner

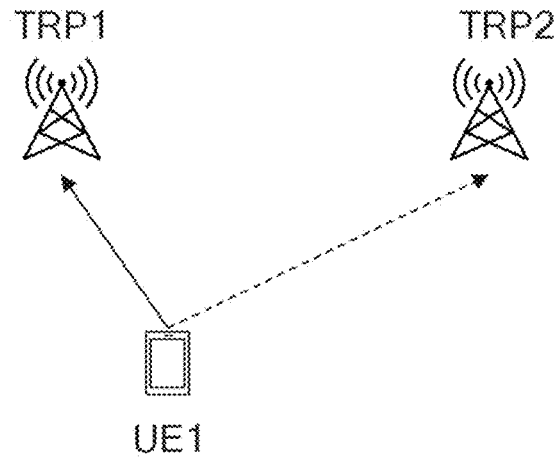
*FIG. 8A*
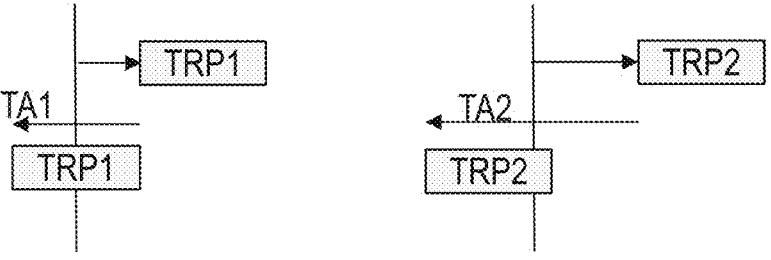
*FIG. 8B*               *FIG. 8C*

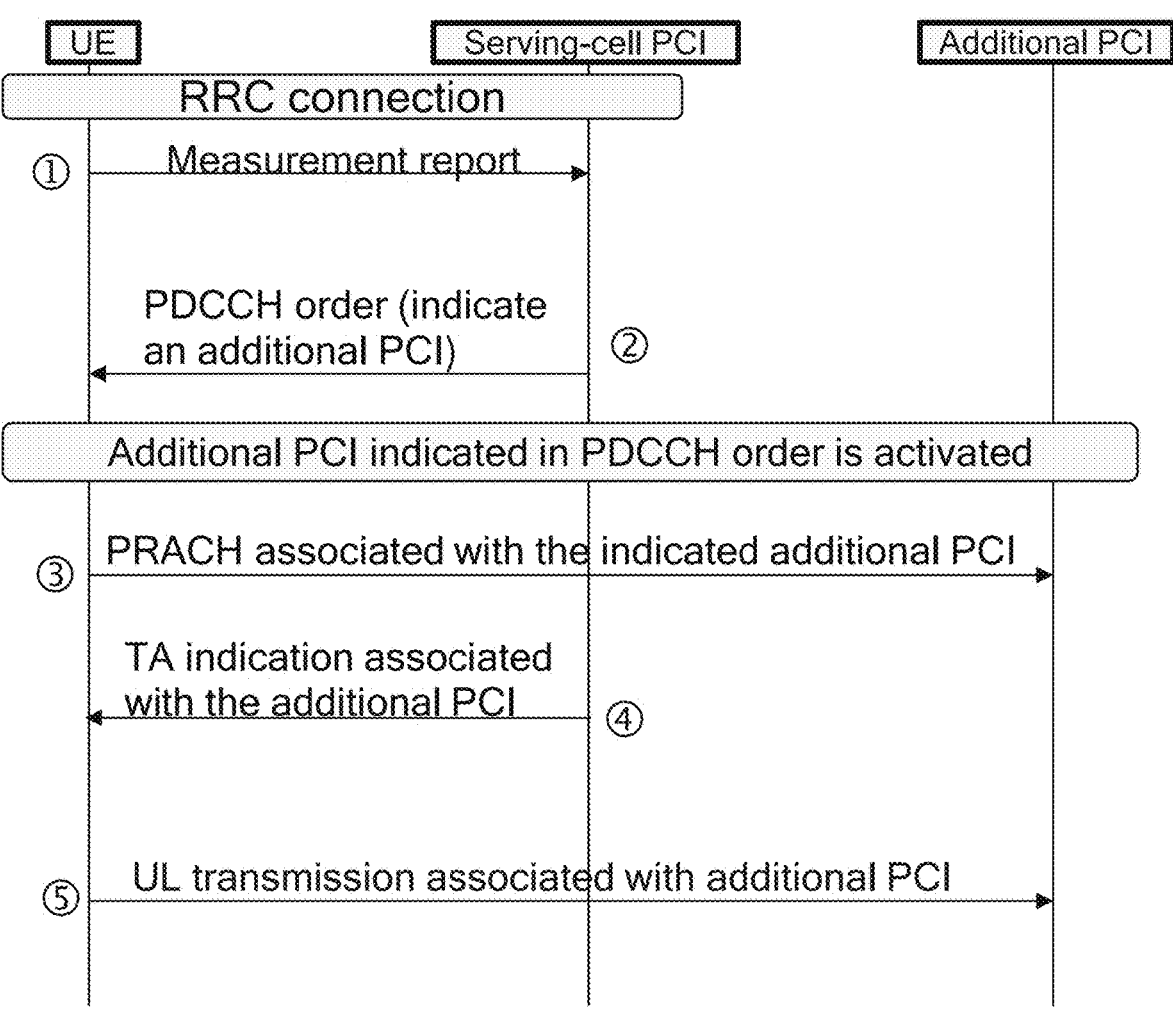
*FIG. 10*

1100

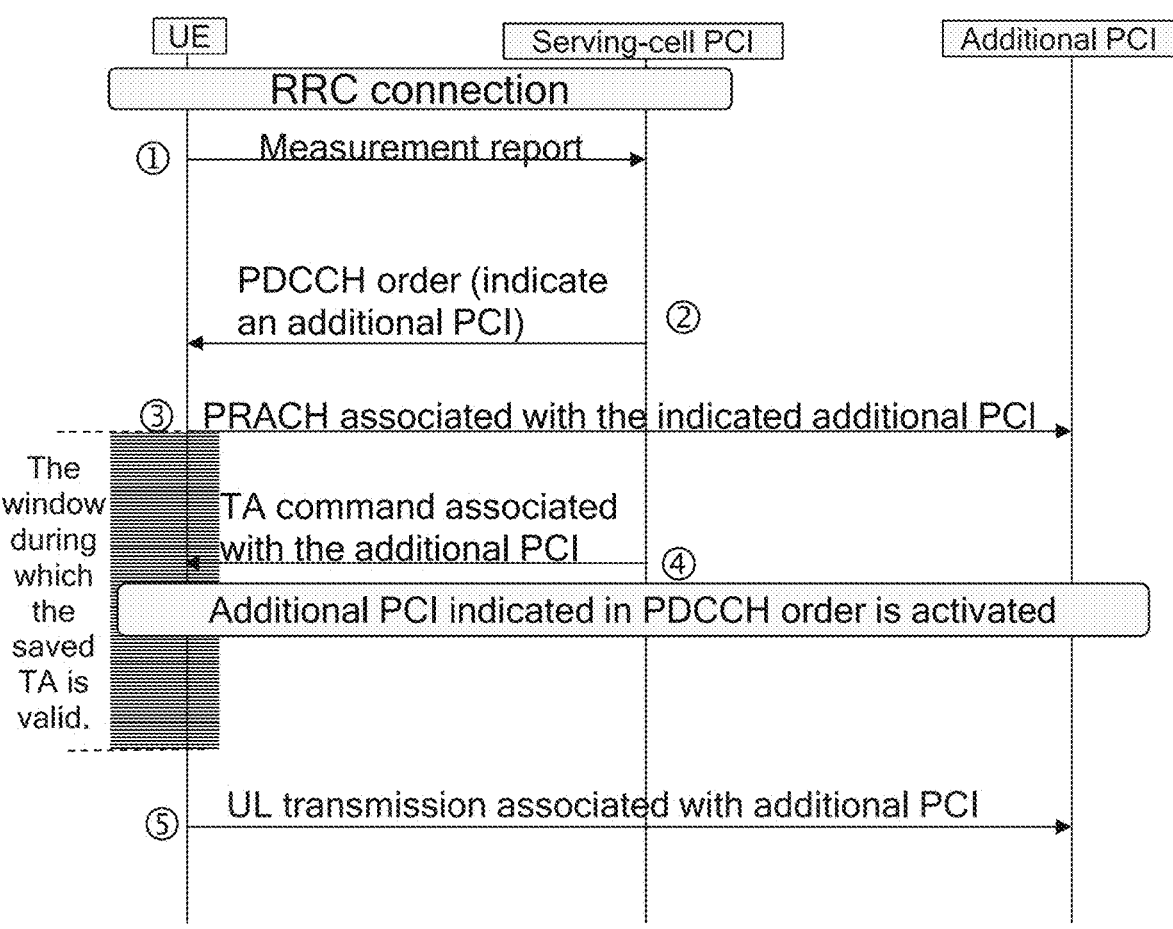
*FIG. 12*

1300

CORESETPoolIndex #0            CORESETPoolIndex #1

Serving-cell PCI        Additional PCI#1        Additional PCI#2

Additional PCI#2 is activated

Additional PCI#1 is activated

PRACH reception

Request current TA associated with PCI#2

Current TA associated with PCI#2

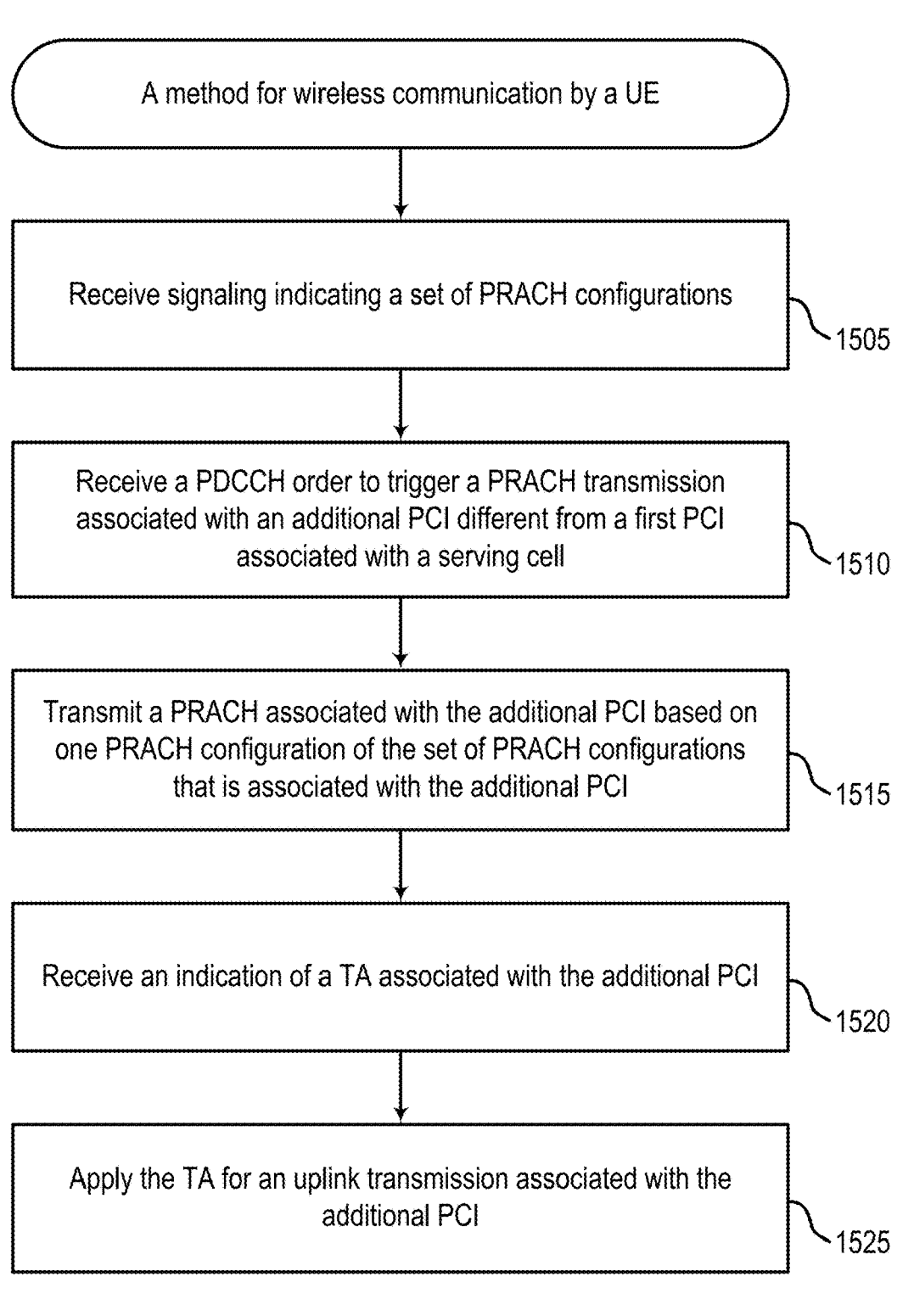

A method for wireless communication by a UE

Receive signaling indicating a set of PRACH configurations

1505

Receive a PDCCH order to trigger a PRACH transmission associated with an additional PCI different from a first PCI associated with a serving cell

1510

Transmit a PRACH associated with the additional PCI based on one PRACH configuration of the set of PRACH configurations that is associated with the additional PCI

1515

Receive an indication of a TA associated with the additional PCI

1520

Apply the TA for an uplink transmission associated with the additional PCI

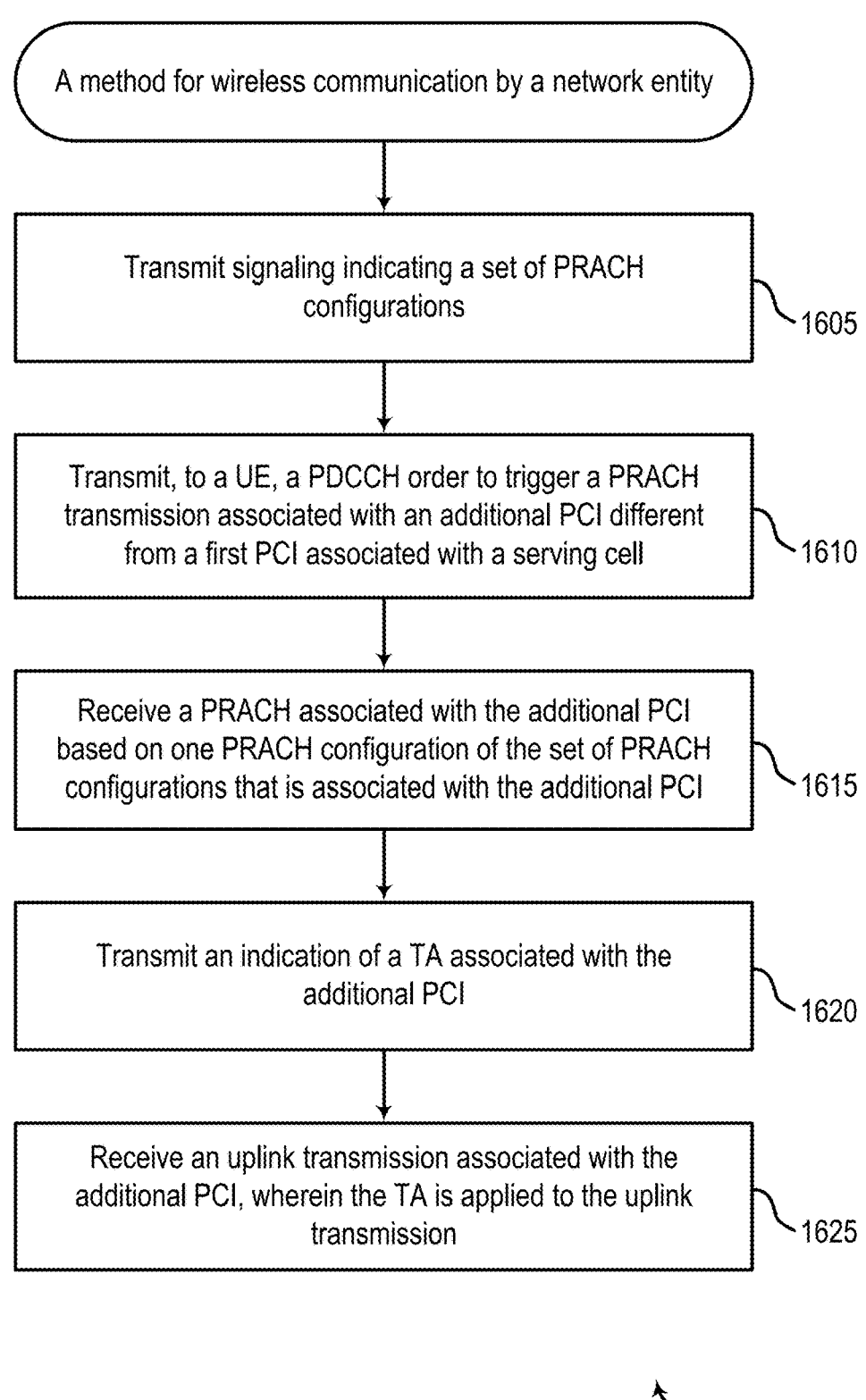

A method for wireless communication by a network entity

Transmit signaling indicating a set of PRACH configurations ⟍1605

Transmit, to a UE, a PDCCH order to trigger a PRACH transmission associated with an additional PCI different from a first PCI associated with a serving cell ⟍1610

Receive a PRACH associated with the additional PCI based on one PRACH configuration of the set of PRACH configurations that is associated with the additional PCI ⟍1615

Transmit an indication of a TA associated with the additional PCI ⟍1620

Receive an uplink transmission associated with the additional PCI, wherein the TA is applied to the uplink transmission ⟍1625

PHYSICAL RANDOM ACCESS CHANNEL ENHANCEMENT FOR INTER-CELL MULTIPLE TRANSMISSION AND RECEPTION POINT

CROSS-REFERENCE TO RELATED APPLICATIONS

This application is a continuation of International Patent Application No. PCT/CN2022/109846, filed Aug. 3, 2022, which is assigned to the assignee hereof and hereby expressly incorporated by reference in its entirety as if fully set forth below and for all applicable purposes.

BACKGROUND

Field of the Disclosure

Aspects of the present disclosure relate to wireless communications, and more particularly, to techniques for random access procedures.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a user equipment (UE). The method includes receiving signaling indicating a set of physical random access channel (PRACH) configurations; receiving, a physical downlink control channel (PDCCH) order to trigger a PRACH transmission associated with an additional PCI different from a first PCI associated with a serving cell; transmitting a PRACH associated with the additional PCI based on one PRACH configuration of the set of PRACH configurations that is associated with the additional PCI;

receiving an indication of a timing advance (TA) associated with the additional PCI; and applying the TA for an uplink transmission associated with the additional PCI.

Another aspect provides a method for wireless communication by a network entity. The method includes transmitting signaling indicating a set of PRACH configurations; transmitting, a PDCCH order to trigger a PRACH transmission associated with an additional PCI different from a first PCI associated with a serving cell; receiving a PRACH associated with the additional PCI based on one PRACH configuration of the set of PRACH configurations that is associated with the additional PCI; transmitting an indication of a TA associated with the additional PCI; and receiving an uplink transmission associated with the additional PCI, wherein the TA is applied to the uplink transmission.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 8A, FIG. 8B and FIG. 8C depict timing advance values for a first and second TRP in a multi-TRP network.

FIG. 10 depicts a call flow diagram for timing adjustment in a multiple transmission reception point (mTRP) scenario, in accordance with aspects of the present disclosure.

FIG. 12 depicts a call flow diagram for timing adjustment in an mTRP scenario, in accordance with aspects of the present disclosure.

FIG. 15 depicts a method for wireless communications.

FIG. 16 depicts a method for wireless communications.

DETAILED DESCRIPTION

Aspects of the present disclosure provide apparatuses, methods, processing systems, and computer-readable mediums for physical random access channel (PRACH) enhancement for inter-cell multiple transmission and reception point (mTRP).

In current wireless systems, a user equipment (UE) may be scheduled to transmit signaling to more than one TRP. In some cases, the UE may be configured with a timing advance (TA) for each scheduled transmission. The TA is used for time synchronization and determines when the UE sends an uplink transmission. The TA allows the UE to adjust the timing of an UL transmission in order to align the UL transmission with future transmissions in time domain. In other words, the TA values are designed to ensure the uplink transmissions arrive at the TRP aligned with a boundary of a time slot.

TA values are typically determined via a random access channel (RACH) procedure, wherein a UE sends a first message referred to as a physical RACH (PRACH) preamble to a network entity (e.g., a base station). The network entity responds with a random access response (RAR) message (MSG2) which may include the TA value.

For inter-cell mTRP operation, a UE and gNB may need to know the UL TA value for the UL transmission associated with the TRP that is associated with a PCI that is different from the serving cell. However, it is unclear how to measure the TA for a PCI different from serving cell, because PRACH transmissions are typically not supported in the non-serving cell.

Aspects of the present disclosure, however, provide techniques for determining a TA associated with an additional PCI that is different from a PCI associated with the serving cell. For example, according to certain aspects, a UE may receive, from the serving cell an order (or command) to trigger a PRACH transmission for the additional PCI. In response, the UE may transmit a PRACH for the additional PCI. The UE may then receive an indication of a TA value to apply for an uplink transmission associated with the additional PCI.

Utilization of the techniques disclosed herein may help enable PRACH for a non-serving cell. Thus, the techniques may allow a UE to efficiently obtain a TA value to apply in the non-serving cell before the additional PCI (e.g., non-serving cell) is activated or when the additional PCI is activated. Thus, the UE may be able to synchronize to the non-serving cell faster, improving overall system performance and user experience.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
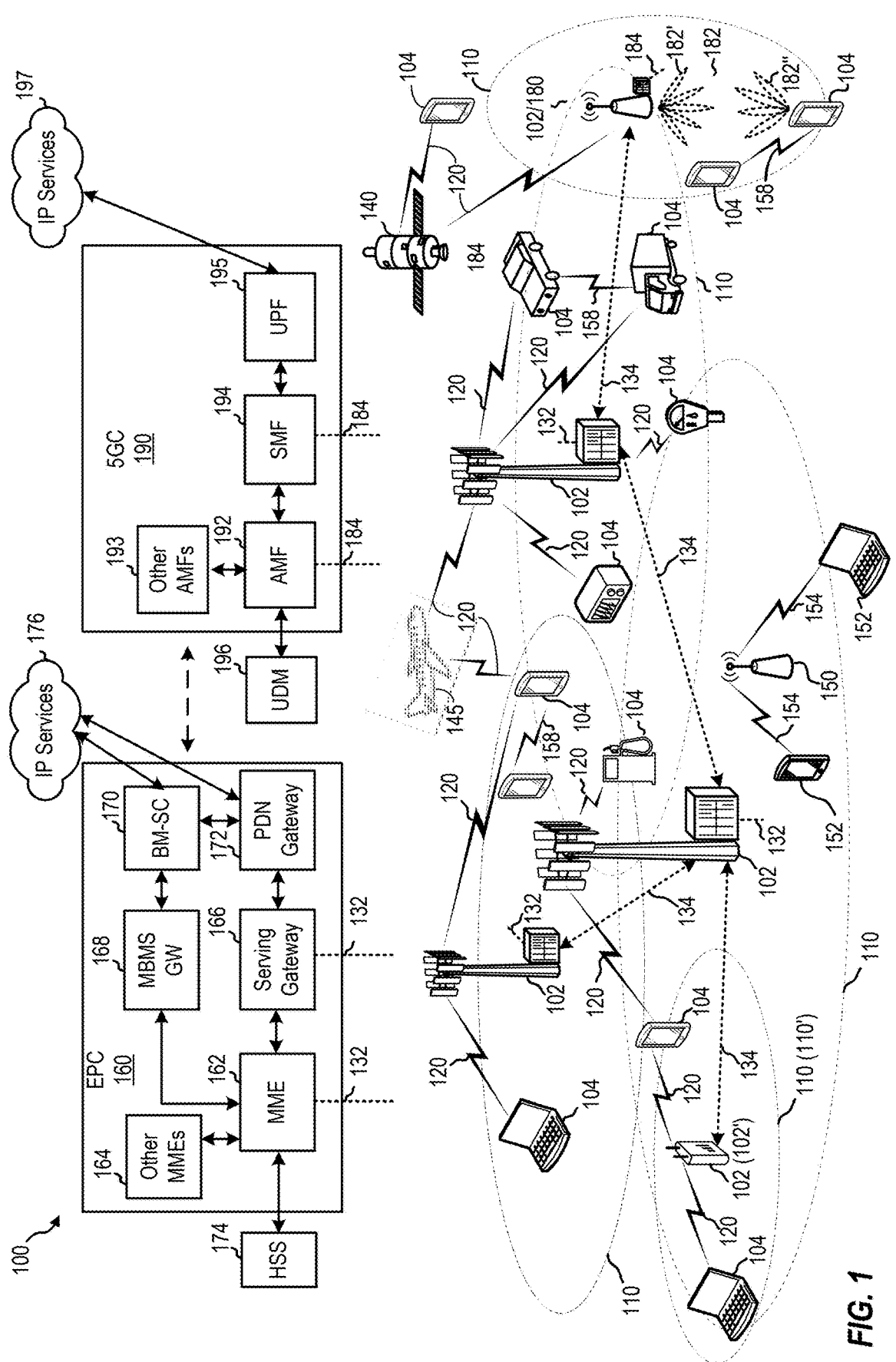
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
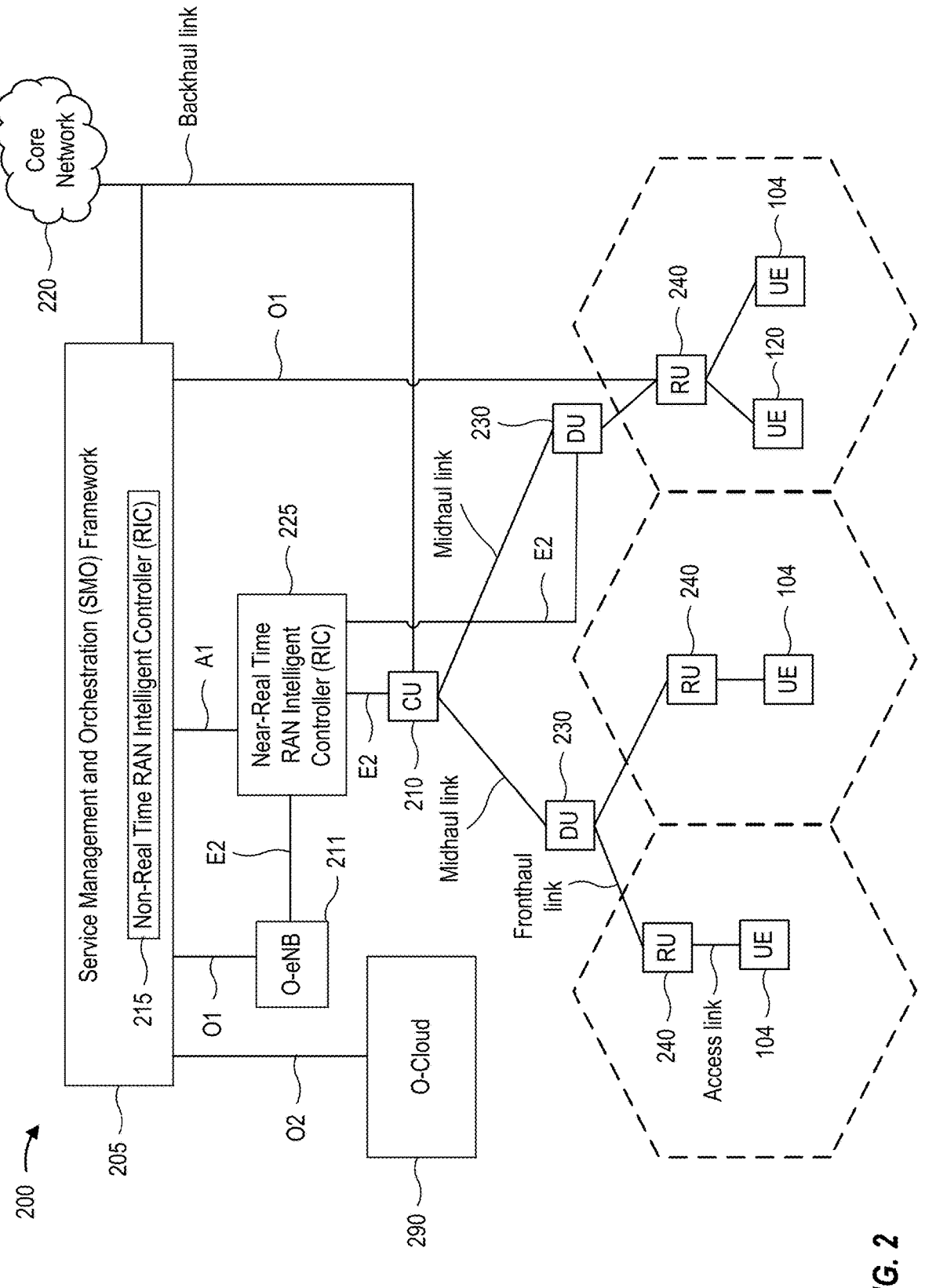
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHZ, which is sometimes referred to (interchangeably) as a "millimeter wave" ("mmW" or "mm Wave"). A base station configured to communicate using mm Wave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182''. UE 104 may also transmit a beamformed signal to the BS 180 in one or more transmit directions 182''. BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
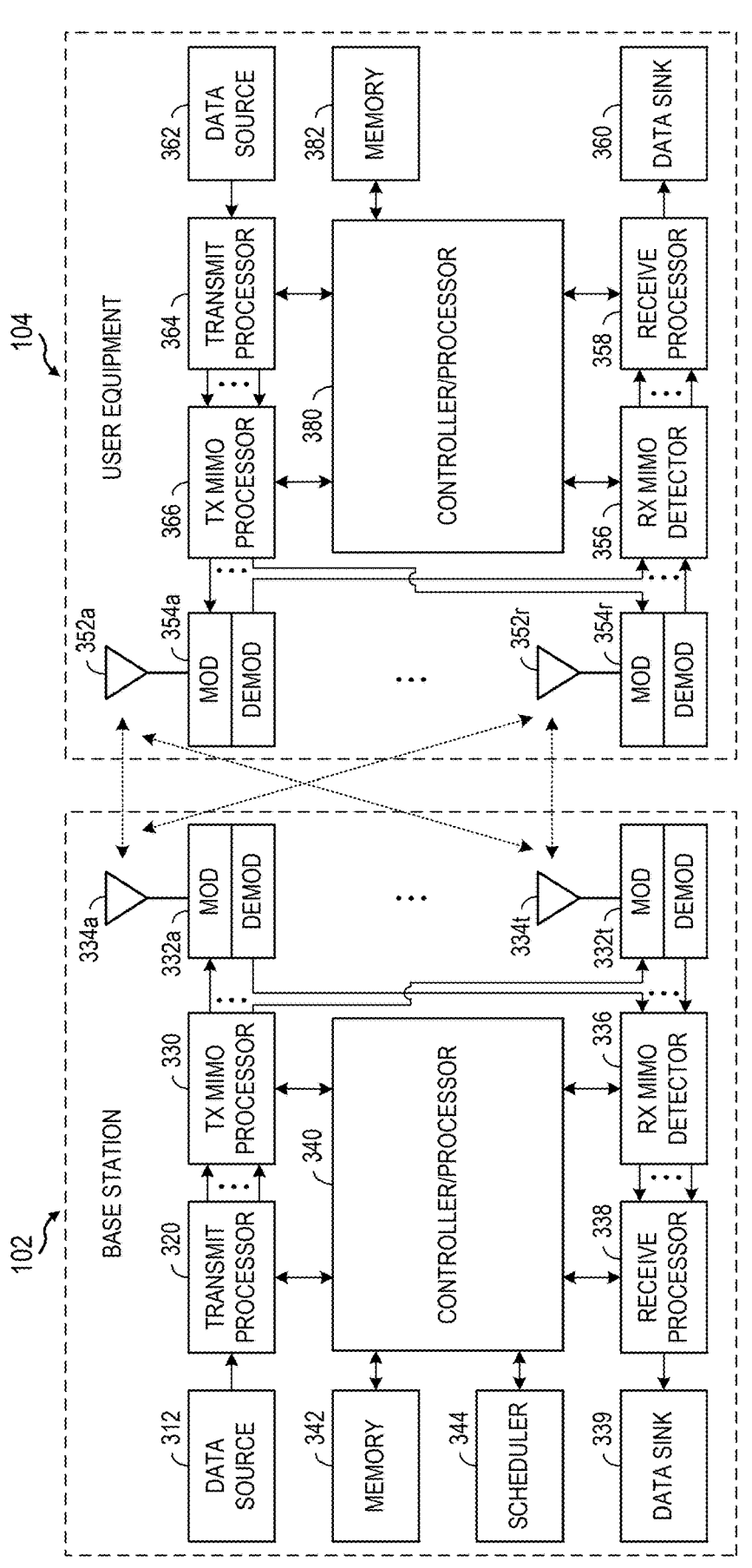
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving"

may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
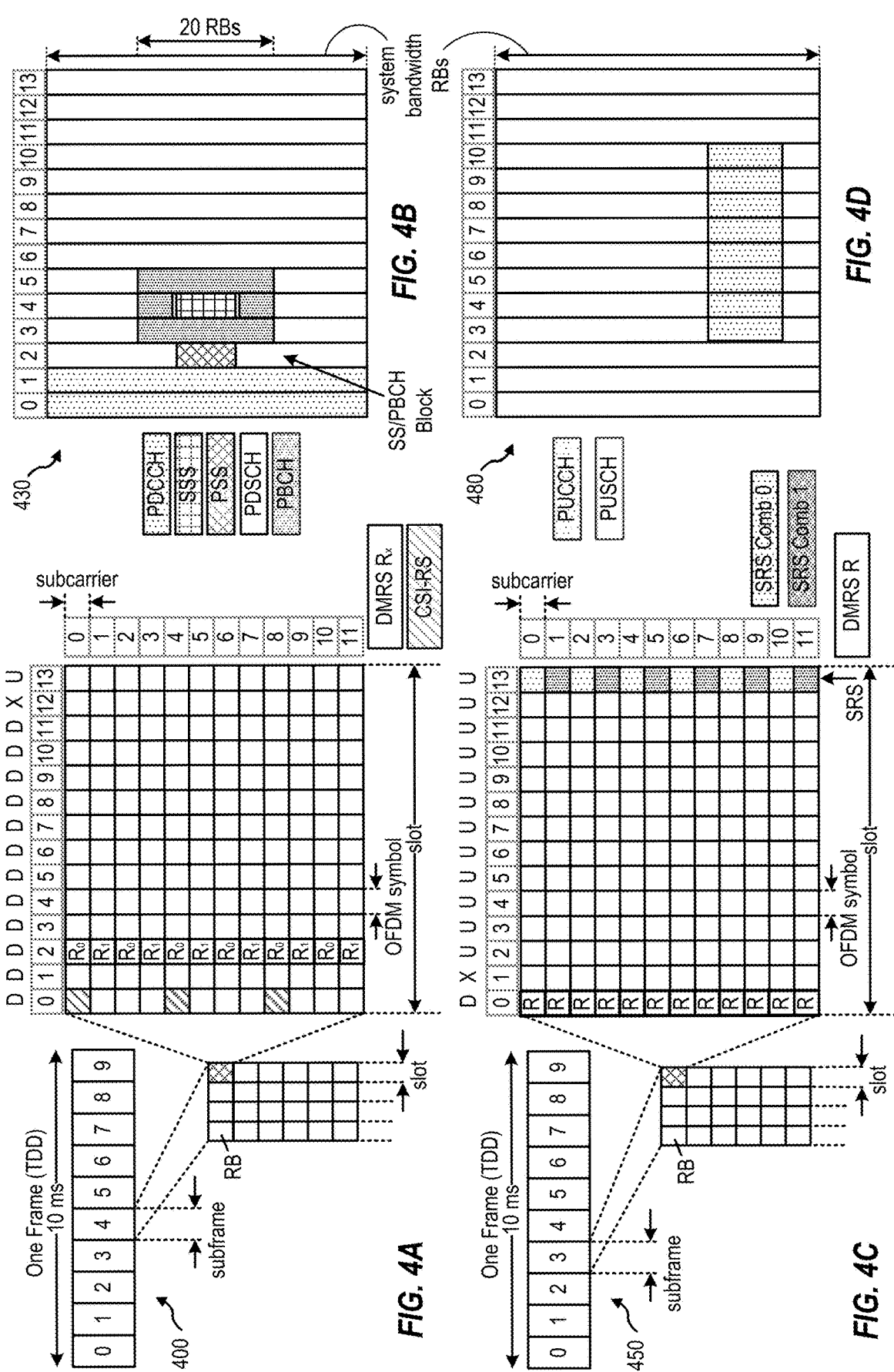
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of mTRP

Current wireless systems support multiple transmission reception point (mTRP) signaling based on single or multiple downlink control information (DCI) transmissions. In the single DCI scenario, a single DCI is sent to schedule an mTRP transmission. In the multiple DCI scenario, each TRP sends a separate DCI.

Figure 5A:
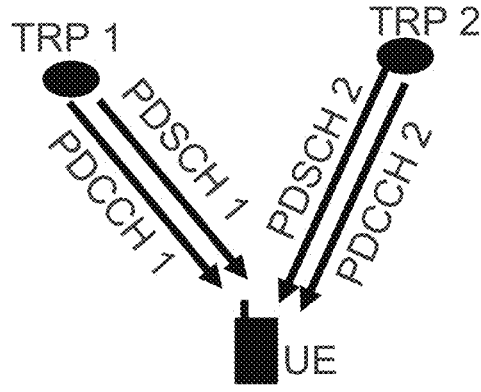
FIGS. 5A and 5B depict example multiple downlink control information (DCI) and multiple transmission reception point (mTRP) operations, and example control resource set (CORESET) pool configurations.

As illustrated in the mTRP scenario shown in FIG. 5A, a first DCI (conveyed via PDCCH1) transmitted from a first TRP (TRP1) may schedule a first physical downlink shared channel (PDSCH1) transmitted from TRP1. A second DCI (conveyed via PDCCH2) transmitted from a second TRP (TRP2) may schedule a second PDSCH (PDSCH2) transmitted from TRP2. For uplink mDCI mTRP, a first DCI (conveyed via PDCCH1) transmitted from a first TRP (TRP1) may schedule a first physical uplink shared channel (PUSCH1) transmitted to TRP1. A second DCI (conveyed via PDCCH2) transmitted from a second TRP (TRP2) may schedule a second PUSCH (PUSCH2) transmitted to TRP2.

Differentiation of TRPs may be performed by a user equipment (UE) based on a pool index value defined within a control resource set (CORESET) for each TRP (e.g., a CORESETPoolIndex). In many cases, the UE will be configured with multi-DCI based multi-TRP in a given component carrier (CC). Each CORESET may be configured with a value of CORESETPoolIndex. In many cases, a maximum of five CORESETs may be configured.

Figure 5B:
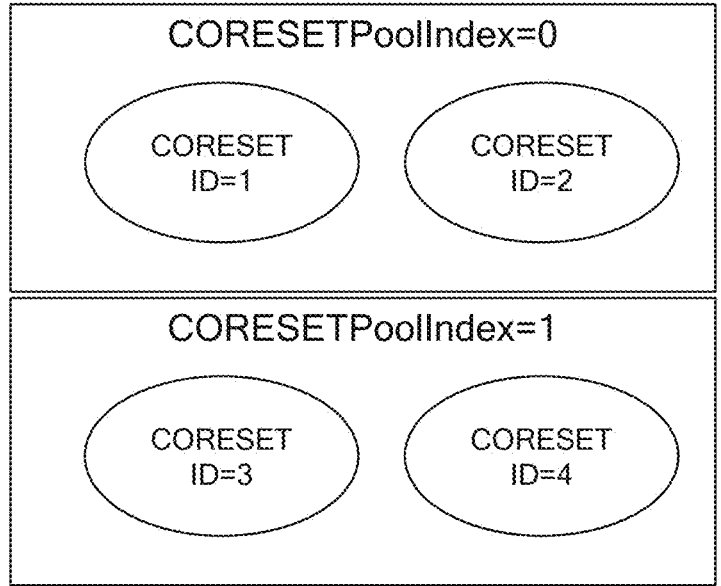

As illustrated in FIG. 5B, the value of CORESETPoolIndex may be assigned an ID of 0 or 1. The CORESETPoolIndex value may group the CORESETs into two groups. For example, CORESETs with CORESET IDs 1 and 2 may be grouped when CORESETPoolIndex equals zero. CORESETs with CORESET IDs 3 and 4 may be grouped when CORESETPoolIndex equals one. In many cases, a UE may be able to distinguish TRPs from one another. In some cases, a UE may be configured by a higher layer parameter (e.g., PDCCH-Config) that contains two different values of CORESETPoolIndex in each CORESET for the active bandwidth part (BWP) of a serving cell. In many cases, the CORESETPoolIndex of the CORESET in which a DCI is received may be used for different purposes. For instance, the CORESETPoolIndex may be used for hybrid automatic repeat request (HARQ) acknowledgement (ACK) feedback.

Different TRPs can have a same physical cell identifier (PCI) (intra-cell mTRP), but with different panels or remote radio heads (RRH) of the same cell or base station. In some cases, different TRPs can have different PCIs (inter-cell mTRP). In such cases, from the UE point of view, mTRP may still be defined in a given serving cell, but the UE may only be aware of one PCI (e.g., the PCI for the cell the UE acquired during a cell search).

Overview of TCI States

A user equipment (UE) may be RRC-configured with a list of up to M (e.g., M=128) candidate Transmission Configuration Indication (TCI) states, at least for the purposes of quasi colocation (QCL) indication. In such cases, the TCI states may be configured/defined in a PDSCH configuration, but a "TCI-StateId" can be used for configuring the TCI states for other purposes, such as CORESET, non-zero power channel state information reference signal (NZP-CSI- RS) resources, physical uplink control channel (PUCCH) resources, and sounding reference signal (SRS) resources.

A medium access control (MAC) control element (MAC-CE) is used to activate a subset (e.g., up to $2^N$) TCI states out of the M TCI states configured for PDSCH QCL indication, for a given CORESETPoolIndex. For PDCCH, a MAC-CE activates one TCI state. N bits in DCI can dynamically indicate one of the activated TCI states for a PDSCH transmission (e.g., N=3 to indicate one of 8 activated TCI states). For multi-DCI based mTRP (e.g., in Rel.16), a PDSCH is associated with the CORESETPoolIndex value of the CORESET in which the DCI is received.

Overview of Inter-cell mTRP

For inter-cell mTRP, a maximum number of additional RRC-configured PCIs per CC may be denoted X and can be reported as a UE capability. In some cases, a UE may support two independent X values (X1, X2), which can be reported as a UE capability. The different values may be selected for two different assumptions on additional SSB time domain position and periodicity with respect to a serving cell SSB. For example, for a first case (e.g., Case A), X1 may represent a maximum number of configured additional PCIs when each configuration of SSB time domain positions and periodicity of the additional PCIs is the same as SSB time domain positions and periodicity of the serving cell PCI. For a second case (e.g., Case B), X2 may represent a maximum number of configured additional PCIs when the configurations of SSB time domain positions and periodicity of the additional PCIs is not according to Case A. By definition, Case A and Case B may not be allowed to be enabled simultaneously. From an RRC signaling perspective, the number of configured additional PCIs may be selected from the group of {1, 2, 3, 4, 5, 6, 7}. In some cases, this UE capability may be dependent on frequency range (e.g., there may be differentiation between FR1 and FR2.

Various parameters, such as center frequency, subcarrier spacing (SCS), and system frame number (SFN) offset may be assumed to be the same for SSBs from the serving cell and SSBs with PCIs different from the serving cell configured for inter-cell multi TRP operation.

In some cases, an RRC indicator/signalling (e.g., re-index the non-serving cell) may be used to indicate the non-serving cell information that a TCI state/QCL information is associated with, where the new indicator/signaling is not the exact PCI value.

There is generally an association between a PCI and a CORESETPoolIndex. In general, the serving cell PCI is associated with active TCI states and only one additional PCI can be associated with the active TCI States. For inter-cell mTRP, one PCI that is associated with one or more activated TCI states for PDSCH/PDCCH is associated with one CORESETPoolIndex. Another PCI associated with one or more activated TCI states for PDSCH/PDCCH may be associated with another CORESETPoolIndex.

Figure 6:
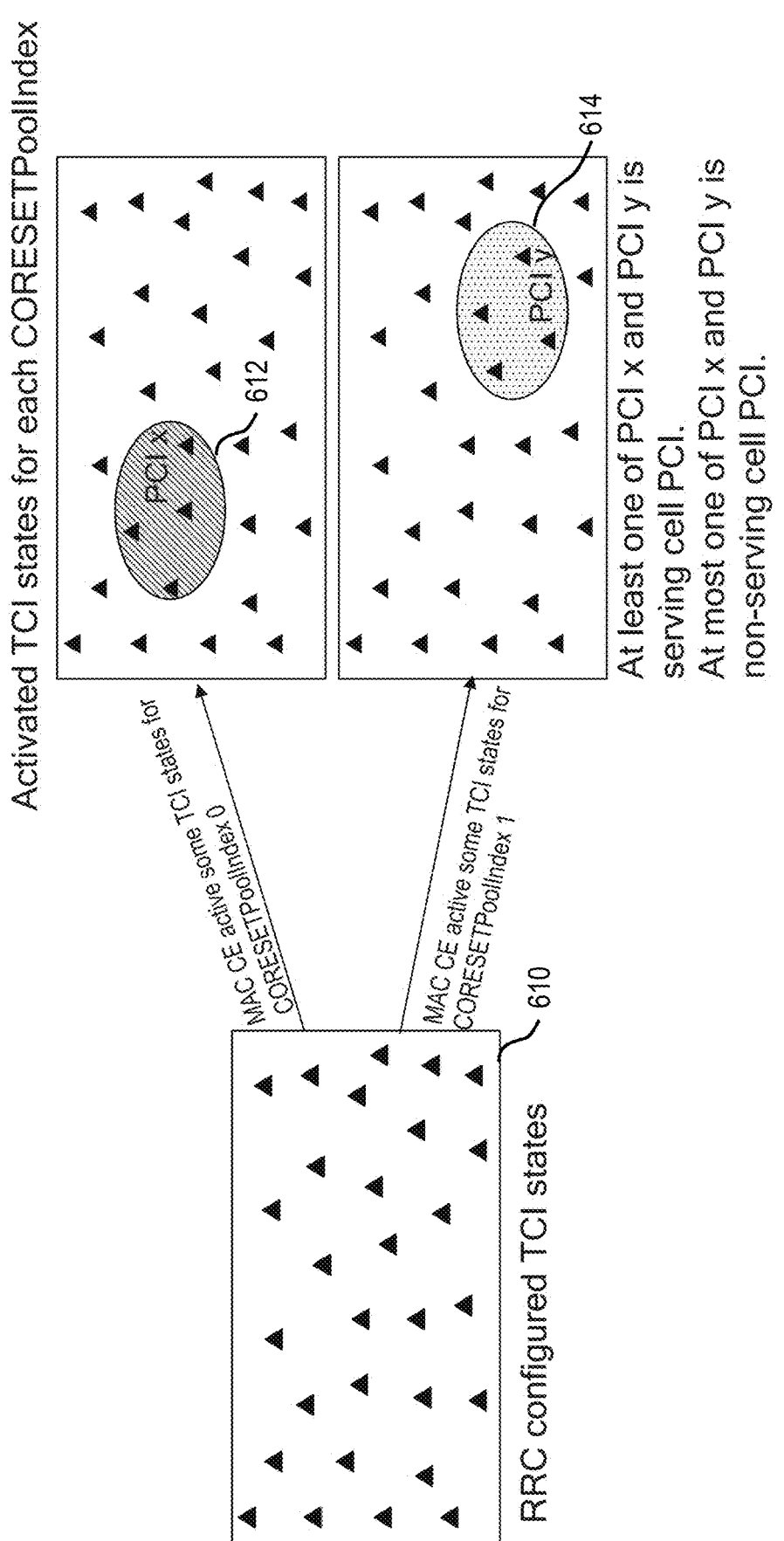
FIG. 6 depicts association between active transmission configuration indicator (TCI) states and physical cell IDs (PCIs).

FIG. 6 depicts an example of association between active TCI states and PCIs. As illustrated, a first MAC CE may activate a first subset 612 of TCI states (from the set 610 of RRC configured TCI states) for CORESETPoolIndex 0. This first subset of TCI states may be associated with a first PCI, PCI x. In this example, PCI x is associated with CORESETPoolIndex 0. A second MAC CE may activate a second subset 614 of TCI states for CORESETPoolIndex 1. This second subset of TCI states may be associated with a second PCI, PCI y. In this example, PCI y is associated with CORESETPoolIndex y. At least one of PCI x and PCI y may be assumed to be a serving cell PCI, while at most one of PCI x and PCI y may be a non-serving cell PCI.

Aspects Related to PRACH Enhancement for Inter-Cell mTRP

As described above, TA values are typically determined via a RACH procedure, wherein a UE sends a first message referred to as a PRACH preamble to a network entity (e.g., a base station). The network entity responds with a random access response (RAR) message (MSG2) which may include the TA value.

Figures 7A, 7B:
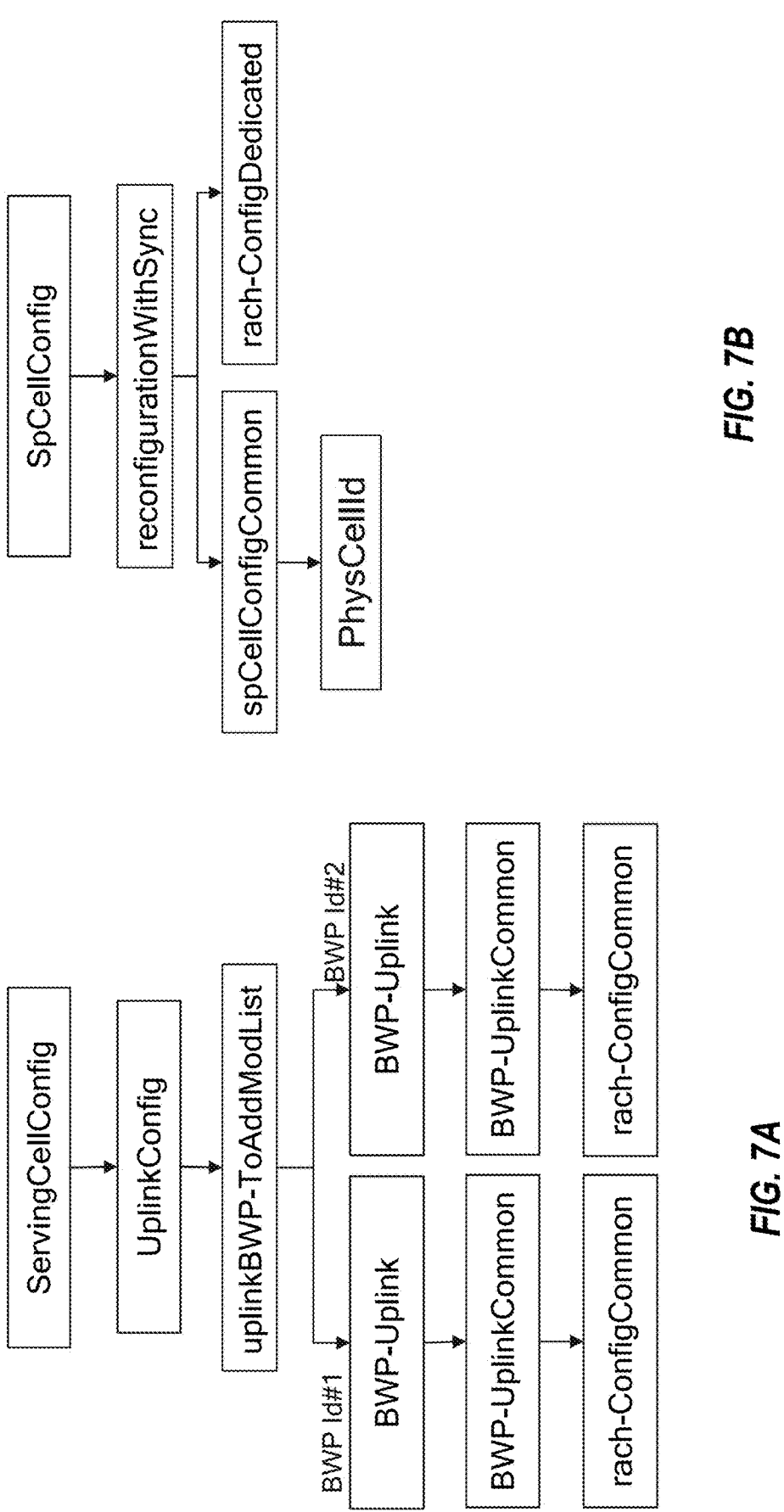
FIGS. 7A and 7B depict example random access channel (RACH) configurations.

In certain systems (e.g., NR Rel.16/Rel.17), PRACH resources may be configured (e.g., via a common RACH configuration rach-ConfigCommon) for each BWP of a serving cell. Except for the case of handover, a UE may be configured with a dedicated RACH configuration (rach-ConfigDedicated, e.g., by reconfigurationWithSync) to perform random access towards a neighbouring cell (non-serving cell). FIGS. 7A and 7B illustrate example RACH configurations for a serving cell and an SpCell (a primary cell of a master or secondary cell group). As illustrated, RACH configurations may be per BWP.

For an mTRP scenario, such as that shown in FIG. 8A, where a UE transmits uplink transmissions to a first and second TRP according to dynamic or configured scheduling, it may be desirable to allow each TRP to belong to a different TA group (TAG). As noted above, a UE may be configured with two TAs for UL multi-DCI transmission for multi-TRP operation. Taking into account different propagation delays from various TRPs, a UE may apply different TAs for UL transmission to different TRPs. Each different TA may be associated with a certain TRP.

Accordingly, different TRPs may have different TA values for UL transmission as illustrated in FIGS. 8B and 8C, with TA1 used for transmissions to TRP1 and TA2 used for transmissions to TRP2. As a result, scheduled UL transmission may overlap in time.

For inter-cell mTRP operation, a UE and gNB may need to know the UL TA value for the UL transmission associated with the TRP that is associated with a PCI that is different from the serving cell. However, it is unclear how to measure the TA for a PCI different from serving cell, because PRACH transmissions are typically not supported in the non-serving cell.

Aspects of the present disclosure, however, provide techniques for determining a TA associated with an additional PCI that is different from a PCI associated with the serving cell.

For example, according to certain aspects, a UE may receive, from the serving cell an PDCCH order (or command) to trigger a PRACH transmission for the additional PCI. In some cases, the PDCCH order may be transmitted from the serving cell, for example, if the additional PCI is not associated with any active TCI state (e.g., if the additional PCI is not activated). In other cases, the PDCCH order may be transmitted from the non-serving cell having an additional PCI, for example, if the additional PCI is associated with one or more active TCI states (e.g. if the additional PCI is activated). In response, the UE may transmit a PRACH for the additional PCI. The UE may then receive an indication of a TA value to apply for an uplink transmission associated with the additional PCI.

In some cases, to support TA measurement for a PCI different from a serving cell, a list of PRACH configurations associated with additional PCIs (different from the serving cell PCI) may be configured. In other words, the UE may receive signaling indicating a set of physical random access channel (PRACH) configurations.

Figure 9:
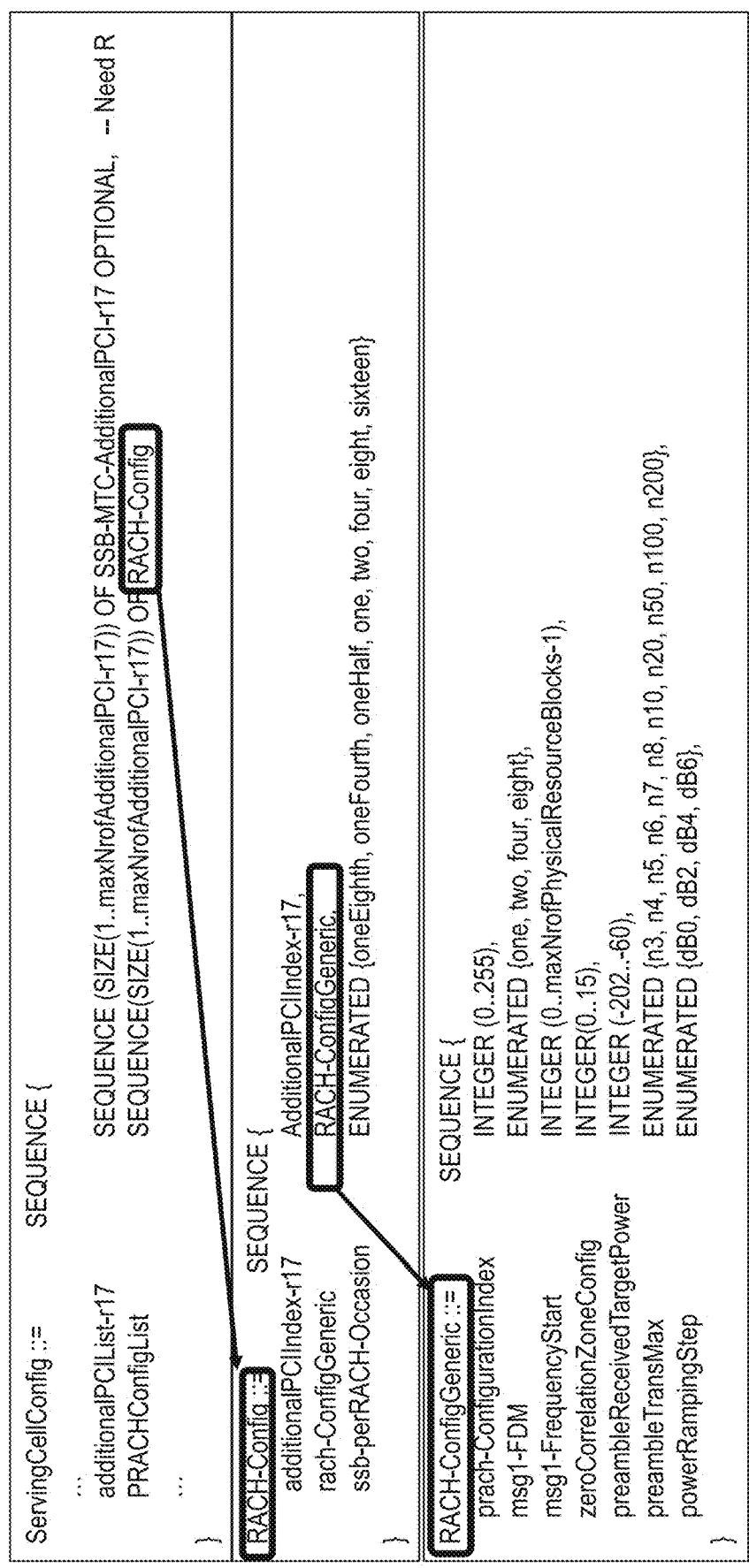
FIG. 9 depicts an example RACH configuration, in accordance with aspects of the present disclosure.

As illustrated in FIG. 9, the list of PRACH configurations may be configured per serving cell. For each of the non-serving cell PRACH configuration in the list, various parameters may be configured. For example, these parameters may include an additional PCI (different from the serving cell PCI), which can be explicitly configured (e.g., by an additional PCI) or implicitly configured (e.g., based on additional PCI index).

As also illustrated in FIG. 9, for each of the non-serving cell PRACH configuration in the list, a generic RACH configuration may also be included, as well as a number of SSBs per RACH occasion (RO).

Each generic RACH configuration may include one or more of the following: a time domain position, a Frequency domain position, a number (e.g., msg1-FDM) of frequency division multiplexed (FDMed) RACH occasions (ROs), a PRACH transmit (Tx) power configuration, and a maximum number of RA preamble transmissions. The time domain position may may be indicated by a parameter a prach-ConfigurationIndex which indicates an entry from a predefined table where the table defines the time domain patterns of the PRACH preamble. The frequency domain position may may be indicated by a starting physical resource block (PRB) msg1-FrequencyStart). The PRACH Tx power configuration may include a preambleReceived-TargetPower and a powerRampingStep. The maximum number of RA preamble transmissions may be indicated by a parameter preambleTransMax.

The general procedure proposed herein to trigger a PRACH in a non-serving cell having an additional PCI to obtain UL TA for the additional PCI different from a serving cell PCI may be understood with reference to the call flow diagram 1000 of FIG. 10.

The example in FIG. 10 illustrates a first case (Case 1), where the triggered PRACH is associated with an additional PCI which is already associated with an active TCI state (e.g., the additional PCI is active). In a second case (Case 2) illustrated in FIG. 11, the PRACH is associated with an additional PCI which is not associated with an active TCI state (e.g., the additional PCI is not active).

In the example illustrated in FIG. 10, a TRP of a serving cell may have a first PCI, while an additional PCI may be associated with a TRP of a non-serving cell. Operations of the serving cell and non-serving cell may be directed by a network entity (e.g., a gNB or node, such as a CU of a disaggregated base station). The description below refers to a gNB, with the understanding that other network entities may perform the same or similar operations.

As illustrated, in a first step (1), after RRC configuration, the UE may perform SSB measurement based on SSB configuration associated with the serving cell and non-serving cells and report the measurement results to the serving cell TRP. For example, the reported measurement results may include physical layer (Layer 1 or L1)-reference signal receive power (L1-RSRP) measurements.

At a second step (2), the gNB may trigger contention free random access (CFRA) for an additional PCI by transmitting a PDCCH order after receiving measurement report of the non-serving cell. For example, the gNB may select which non-serving cell to direct the UE to transmit a PRACH on, based on the measurement results received in the report. In the example illustrated in FIG. 10, a PDCCH order is transmitted from serving cell. In some cases, the PDCCH order may be transmitted from an additional PCI (e.g., non-serving cell) although this is not shown in FIG. 10.

The PDCCH order may convey a DCI format 1_0 scrambled by cell radio network temporary identifier (C-RNTI) with a frequency domain resource allocation (FDRA) field set to all ones. The PDCCH order may indicate various parameters for the PRACH transmission. For example, the parameters may include the random access preamble index, SSB index, and PRACH mask index.

In addition, to distinguish which PRACH configuration is used for the PRACH transmission, additional field may be included in the PDCCH order to indicate a PRACH configuration from the list of PRACH configurations described above. Some of the reserved fields in the PDCCH order can be reused to indicate the additional PCI of the PRACH configuration.

Since the PRACH configuration for the serving cell is used, a conventional (e.g., legacy) PDCCH order may not include a PRACH configuration related indication. However, for inter-cell mTRP, which PRACH configuration is to be used may need to be indicated in the PDCCH order.

At a third step (3), upon reception of the PDCCH order, the UE transmits a PRACH, based on the indication in the PDCCH order. In some cases, to determine the PRACH transmission power, the related parameters (e.g., preambleReceivedTargetPower, powerRampingStep, or preambleTransMax) in the PRACH configuration associated with the additional PCI indicated in the PDCCH order may be used.

Figure 11:
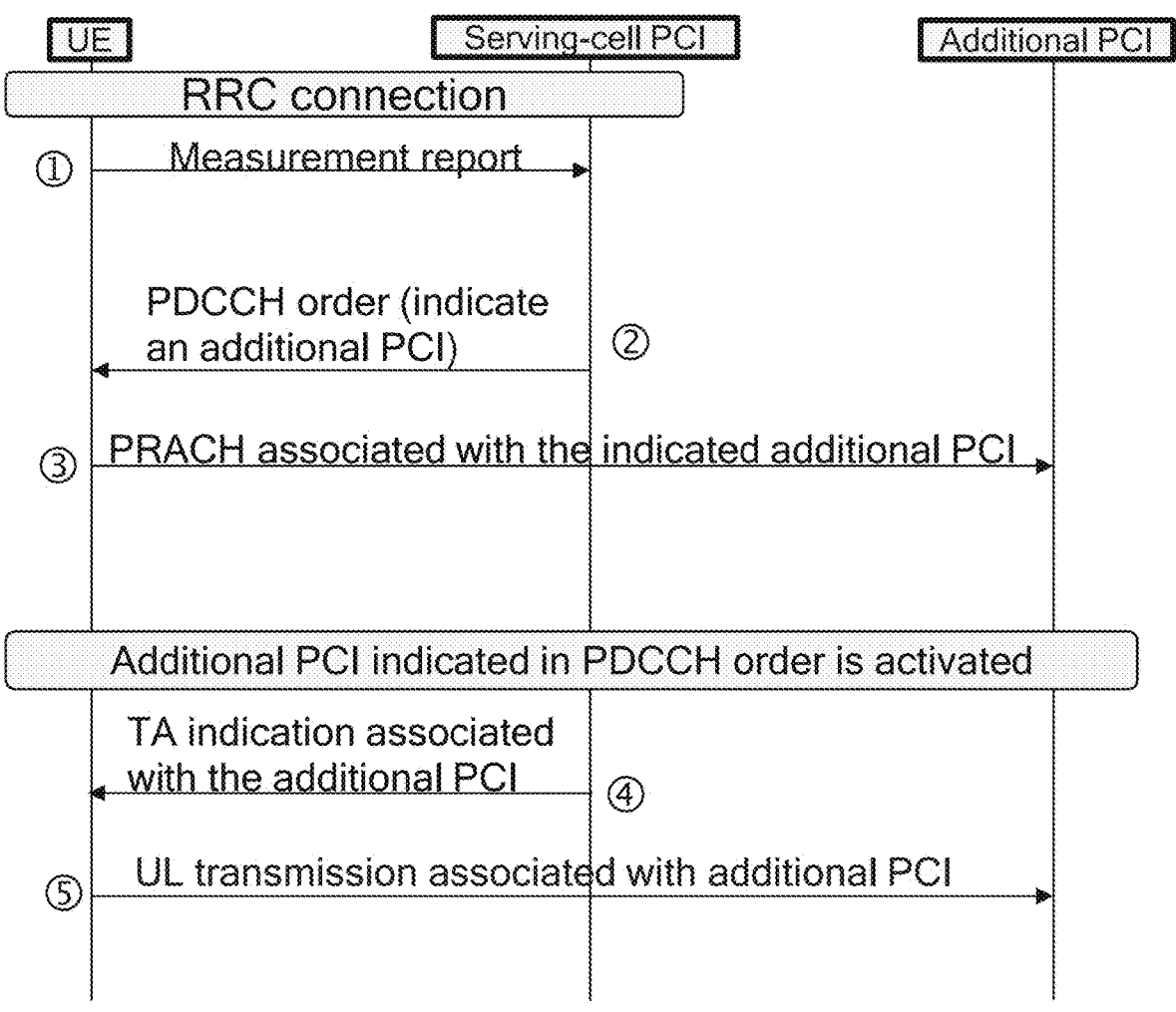
FIG. 11 depicts a call flow diagram for timing adjustment in an mTRP scenario, in accordance with aspects of the present disclosure.

As illustrated in the call flow diagram 1100 of FIG. 11, PRACH transmission may also be triggered where the PRACH is associated with an additional PCI which is not associated with an active TCI state (Case 2). In this case, the additional PCI indicated in the PDCCH order may be activated after the PRACH transmission.

From the network (gNB) perspective, after receiving the PRACH, the TRP associated with the additional PCI (different from the serving cell) may measure the TA for the additional PCI. The TRP may then indicate the TA to the UE, once the TCI states associated with the additional PCI is activated. From the UE perspective, the UE may only send the PRACH and transmit on the UL, based on the TA indication from gNB.

According to certain aspects, for multiple TAs for inter-cell mTRP, a UE capability may be defined. This capability may be reported to indicate the UE's ability to support multiple TAs.

In some cases, the reported capability may indicate the UE is capable of maintaining at least two TAs for inter-cell mTRP. This may be an optional UE capability, which may be signaled separately from two TAs for intra-cell mTRP. The UE may also indicate various capabilities, such as the capability to support (at least) two TAs only for intra-cell mTRP or the capability to support (at least) two TAs for both intra-cell and inter-cell mTRP.

In some cases, the maximum number of PRACH configurations associated with additional PCI can be defined as a UE capability. For example, a UE may report that it supports two independent Y values (Y1, Y2), for example, for two different assumptions on additional SSB time domain position and periodicity with respect to serving cell SSB. For example, Y1 (e.g., for Case A), may represent a maximum number of PRACH configurations associated with additional PCIs when each configuration of SSB time domain positions and periodicity of the additional PCIs is the same as SSB time domain positions and periodicity of the serving cell PCI. Y2 (e.g., for Case B), may represent a maximum number of PRACH configurations associated with additional PCIs when the configurations of SSB time domain positions and periodicity of the additional PCIs is not according to Case A.

Aspects Related to How to Indicate the TA for Additional PCI

Aspects of the present disclosure provide various options for how to indicate the TA for additional PCI without conventional random access response (RAR) monitoring.

To indicate the TA for additional PCI different from serving cell, the cases noted above may be considered, (Case 1) where the PRACH is associated with an additional PCI which is already associated with an active TCI state, as well (Case 2) where the PRACH is associated with an additional PCI which is not associated with an active TCI state.

For Case 1, once the UE receives a TA command MAC CE, the UE may apply the TA command some time period after reception of the MAC CE. The time period may be according to the conventional processing time of existing TA command MAC CE.

For Case 2, the UE may need to save the TA and start to use it only after an active TCI state associated with the additional PCI is indicated in MAC CE (e.g., via a TCI activation MAC CE).

As illustrated in the call flow diagram 1200 of FIG. 12, to make sure the saved TA is not outdated, a time window can be defined. This time window may define a period during which the saved TA is valid.

The window can start from the end of the PRACH transmission, as illustrated in FIG. 12, or from the end of the TA command MAC CE reception. The duration of the window can be predefined or configured.

If the additional PCI is activated during the window, as in the example illustrated in FIG. 12, the UE may apply the saved TA for the additional PCI. Otherwise, the UE may drop the saved TA for the additional PCI.

In some cases, the maximum number of TAs the UE can save may be reported as a UE capability. The reported value may indicate the maximum number of TAs within one serving cell or the maximum number of TAs across all serving cells.

There are various options for how to indicate the TA using a TA command MAC CE.

For example, according to a first option, the TA command may indicate a TA adjustment value with respect to the previous TA associated with the same CORESETPoolIndex as the additional PCI. In this case, the TA associated with the additional PCI may be obtained by applying the TA adjustment value on top of the previous TA.

According to a second option, the TA command indicates a TA offset with respect to a reference initial TA. The TA associated with the additional PCI is obtained by applying the TA offset on top of the reference initial TA. For a reference initial TA, the latest initial TA of the serving cell can be used. If the serving cell PCI is associated with two CORESETPoolIndex values, the initial TA associated with a fixed CORESETPoolIndex value (e.g., lowest or highest CORESETPoolIndex value) may be used as the reference initial TA.

These different options may require different inter-TRP coordination and may be applicable for different cases.

For the first option, in order to get the previous TA associated with the same CORESETPoolIndex as the additional PCI, inter-TRP coordination without UE involvement may be needed. For example, TRPs associated with the serving cell PCI and additional PCIs may need to communicate with each other to get the TA associated with each of the additional PCIs.

One potential benefit of the first option is that a TA update across additional PCIs may be transparent to the UE. The first option may be less than optimal in some cases, as the TRP may not know the absolute UL TA value. In addition, if the CORESETPoolIndex associated with the additional PCI is not associated with any PCI before, there may be no previous TA associated with the CORESETPoolIndex (e.g., no reference TA for the TA adjustment value).

Figure 13:
FIG. 13 depicts a call flow diagram for timing adjustment in an mTRP scenario, in accordance with aspects of the present disclosure.

As illustrated in the call flow diagram 1300 of FIG. 13, for the first option, in order to obtain the TA offset between the TA of the activated additional PCI and the current TA of a second additional PCI that is associated with a same CORESETPoolIndex value as the activated additional PCI, some inter-TRP coordination without UE involvement may be needed (e.g., with a first additional PCI requesting a current TA associated with a second additional PCI).

Figures 14A, 14B:
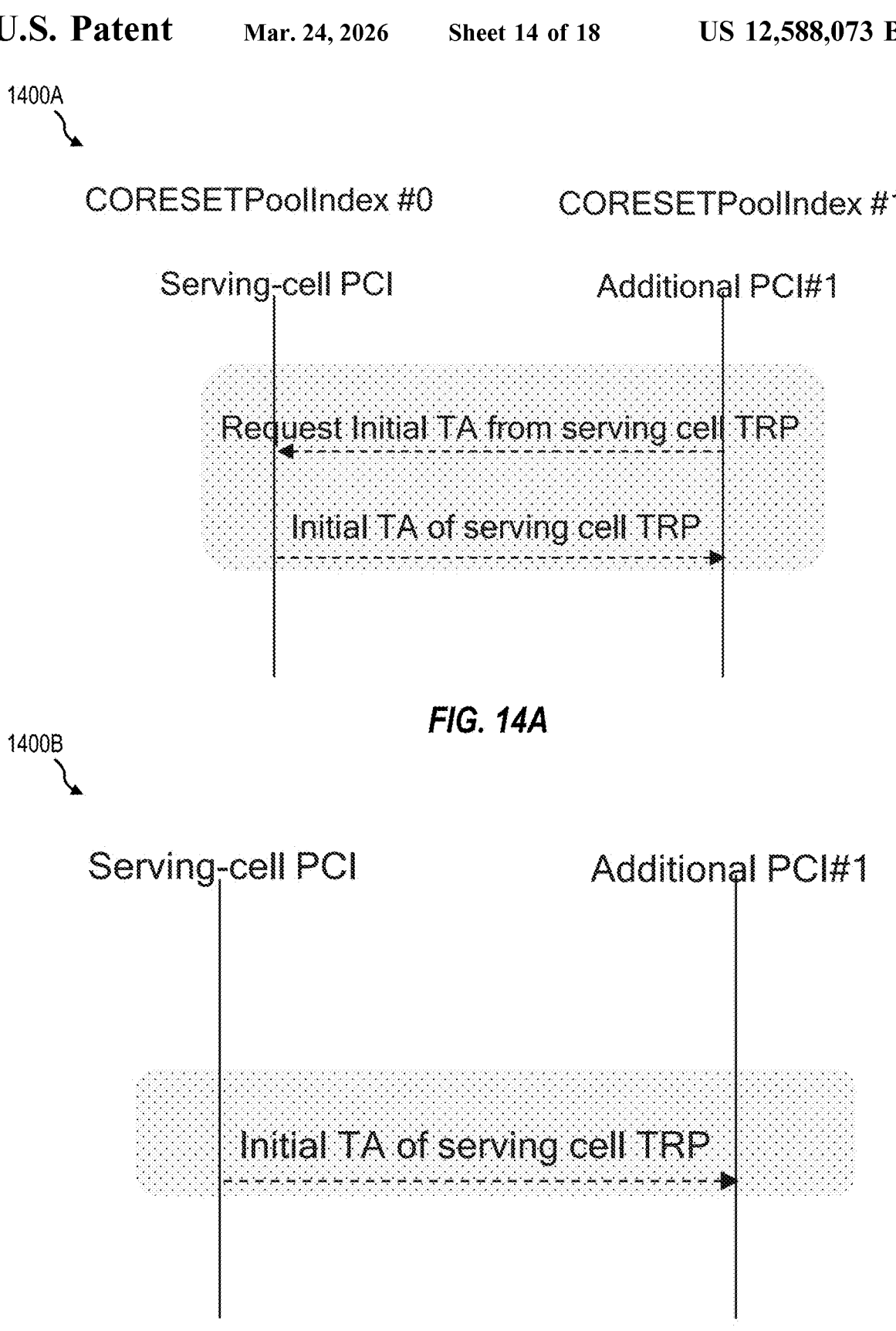
FIGS. 14A and 14B depict call flow diagrams for timing adjustment in mTRP scenarios, in accordance with aspects of the present disclosure.

As illustrated in the call flow diagram 1400A of FIG. 14A, according to a first alternative, the TRP associated with the activated additional PCI may request an initial TA associated with the serving cell PCI and the TRP associated with the serving cell PCI may send the initial TA to the TRP associated with the activated additional PCI in response to the request.

As illustrated in the call flow diagram 1400B of FIG. 14B, according to a second alternative, the TRP associated with the serving cell PCI may proactively send the initial TA associated with the serving cell PCI without a request associated with the additional PCI.

For the second option, the TRP may not need to know the absolute UL TA. However, the UE may need to be able to distinguish whether the TA command is to indicate an TA offset with respect to a reference initial TA or to indicate an TA adjustment value with respect to the previous TA (e.g., a legacy TA command).

Various options may be used to address this. For example, a conventional (legacy) TA command MAC CE may be used and some type of rule may be defined to distinguish with the legacy TA command MAC CE. For example, a time window can be predefined or configured. The start position and duration of the time window can be predefined or configured. For example, the start position can be the end of the PRACH transmission or X symbols/slots after PRACH transmission. The duration may be a predefined value or configured value.

In some cases, the first MAC CE after the PRACH transmission which indicates the same TAG ID corresponding to the additional PCI and associated with the same CORESETPoolIndex as the additional PCI may be used to indicate the TA offset with respect to the reference initial TA. For case 1, the TAG ID associated with the additional PCI can be preconfigured or determined based on the CORESETPoolIndex value associated with the additional PCI. For case 2, the TAG ID associated with the additional PCI may need to be preconfigured. For example, this may be because the CORESETPoolIndex associated with the additional PCI is not known yet which is based on TCI activation MAC CE.

In some cases, a new TA command MAC CE may be defined to indicate the TA offset with respect to a reference initial TA. In this case, the new TA command MAC CE may include the additional PCI information.

Example Operations of a User Equipment

FIG. 15 shows an example of a method 1500 for wireless communication by a UE, such as a UE 104 of FIGS. 1 and 3.

Method 1500 begins at step 1505 with receiving signaling indicating a set of PRACH configurations. In some cases, the operations of this step refer to, or may be performed by, circuitry for receiving and/or code for receiving as described with reference to FIG. 17.

Method 1500 then proceeds to step 1510 with receiving a PDCCH order to trigger a PRACH transmission associated with an additional PCI different from a first PCI associated with a serving cell. For example, the PDCCH order may be received from the serving cell or from (a cell associated with) an additional PCI. In some cases, the operations of this step refer to, or may be performed by, circuitry for receiving and/or code for receiving as described with reference to FIG. 17.

Method 1500 then proceeds to step 1515 with transmitting a PRACH associated with the additional PCI based on one PRACH configuration of the set of PRACH configurations that is associated with the additional PCI. In some cases, the operations of this step refer to, or may be performed by, circuitry for transmitting and/or code for transmitting as described with reference to FIG. 17.

Method 1500 then proceeds to step 1520 with receiving an indication of a TA associated with the additional PCI. In some cases, the operations of this step refer to, or may be performed by, circuitry for receiving and/or code for receiving as described with reference to FIG. 17.

Method 1500 then proceeds to step 1525 with applying the TA for an uplink transmission associated with the additional PCI. In some cases, the operations of this step refer to, or may be performed by, circuitry for applying and/or code for applying as described with reference to FIG. 17.

In some aspects, each PRACH configuration in the set indicates one or more of: an additional PCI, an additional PCI index, a generic RACH configuration, and a number of SSBs per RO.

In some aspects, the generic RACH configuration comprises one or more of a time domain position, a frequency domain position, a transmit power configuration, and a maximum number of random access preamble transmissions.

In some aspects, the method 1500 further includes transmitting a measurement report to the serving cell PCI, wherein the measurement report includes measurement results based on a SSB associated with the additional PCI and the PDCCH order is received after transmitting the measurement report. In some cases, the operations of this step refer to, or may be performed by, circuitry for transmitting and/or code for transmitting as described with reference to FIG. 17.

In some aspects, the measurement results include one or more L1-RSRP measurements.

In some aspects, the PDCCH order indicates a RA preamble index, a SSB index, and a PRACH mask index.

In some aspects, the PDCCH order indicates the one PRACH configuration of the indicated set of PRACH configurations.

In some aspects, a RACH configuration is indicated using one or more reserved bits in the PDCCH order.

In some aspects, the method 1500 further includes determining a transmit power for the PRACH transmission based on the PRACH configuration indicated in PDCCH order. In some cases, the operations of this step refer to, or may be performed by, circuitry for determining and/or code for determining as described with reference to FIG. 17.

In some aspects, the additional PCI is associated with one or more active TCI states.

In some aspects, the additional PCI is not associated with any active TCI state.

In some aspects, the method 1500 further includes transmitting, to a serving cell, UE capability information indicating that the UE is capable of supporting at least two TAs. In some cases, the operations of this step refer to, or may be performed by, circuitry for transmitting and/or code for transmitting as described with reference to FIG. 17.

In some aspects, the UE capability information additionally indicates that the UE is capable of supporting two TAs when the serving cell is configured with multiple CORESET pool index values and the serving cell is not configured with additional PCIs.

In some aspects, the UE capability information additionally indicates that the UE is capable of supporting two TAs when the serving cell is configured with multiple CORESET pool index values and one or more additional PCIs.

In some aspects, the UE capability information additionally indicates a first maximum number of PRACH configurations for additional PCIs and a second maximum number of PRACH configurations for additional PCIs.

In some aspects, the first maximum number is determined based on an assumption that each SSB configuration indicates an SSB time domain position and a periodicity of an additional PCI that is the same as an SSB time domain position and a periodicity of the serving cell PCI; and the second maximum number is determined based on an assumption that at least one SSB configuration indicates an SSB time domain position and a periodicity of the additional PCIs that is different from an SSB time domain position and a periodicity of the serving cell PCI.

Figure 17:
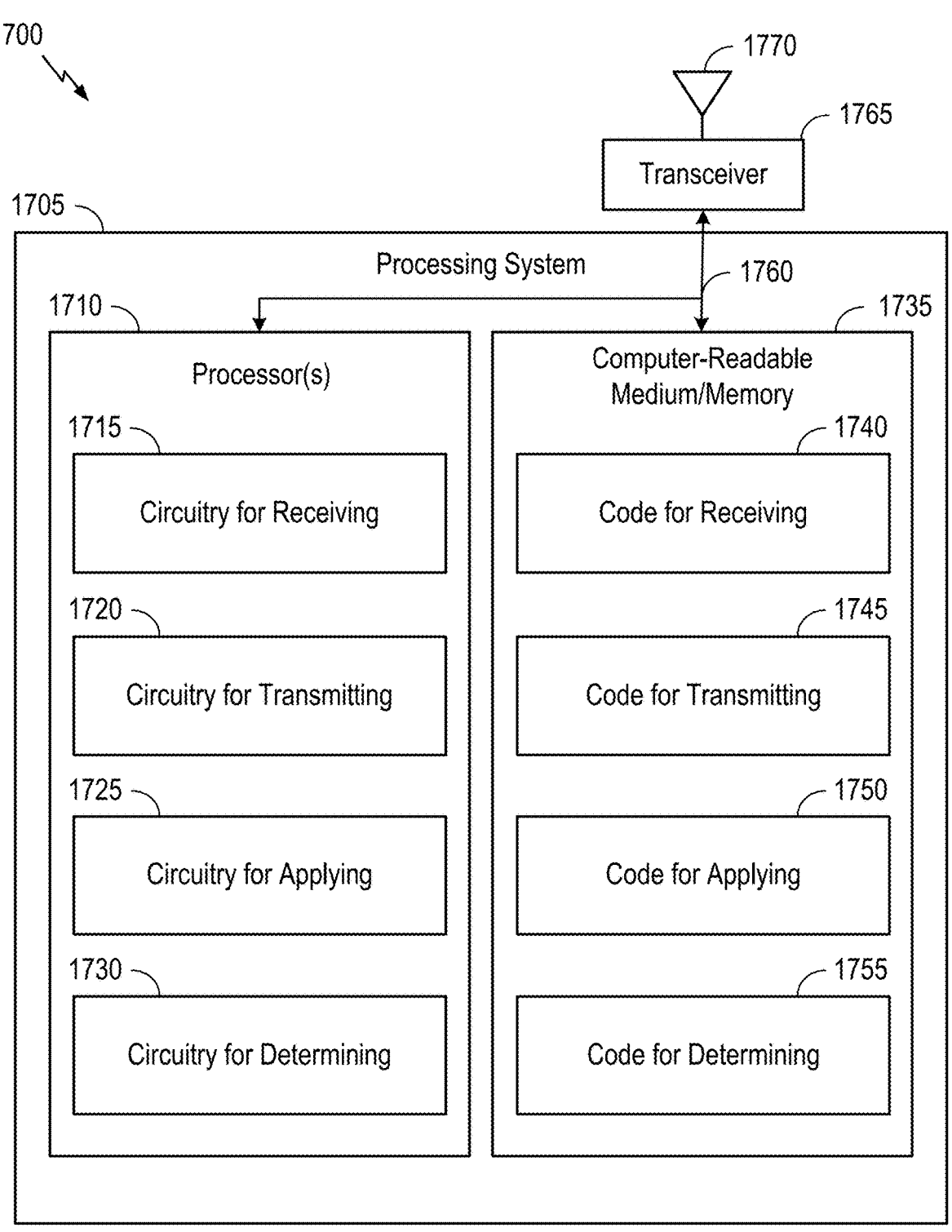
FIG. 17 depicts aspects of an example communications device.

In one aspect, method 1500, or any aspect related to it, may be performed by an apparatus, such as communications device 1700 of FIG. 17, which includes various components operable, configured, or adapted to perform the method 1500. Communications device 1700 is described below in further detail.

Note that FIG. 15 is just one example of a method, and other methods including fewer, additional, or alternative steps are possible consistent with this disclosure.

Example Operations of a Network Entity

FIG. 16 shows an example of a method 1600 for wireless communication by a network entity, such as a BS 102 of FIGS. 1 and 3, or a disaggregated base station as discussed with respect to FIG. 2.

Method 1600 begins at step 1605 with transmitting signaling indicating a set of PRACH configurations. In some cases, the operations of this step refer to, or may be performed by, circuitry for transmitting and/or code for transmitting as described with reference to FIG. 18.

Method 1600 then proceeds to step 1610 with transmitting, to a UE, a PDCCH order to trigger a PRACH transmission associated with an additional PCI different from a first PCI associated with a serving cell. For example, the PDCCH order may be transmitted from the serving cell or from (a cell associated with) an additional PCI. In some cases, the operations of this step refer to, or may be performed by, circuitry for transmitting and/or code for transmitting as described with reference to FIG. 18.

Method 1600 then proceeds to step 1615 with receiving a PRACH associated with the additional PCI based on one PRACH configuration of the set of PRACH configurations that is associated with the additional PCI. In some cases, the operations of this step refer to, or may be performed by, circuitry for receiving and/or code for receiving as described with reference to FIG. 18.

Method 1600 then proceeds to step 1620 with transmitting an indication of a TA associated with the additional PCI. In some cases, the operations of this step refer to, or may be performed by, circuitry for transmitting and/or code for transmitting as described with reference to FIG. 18.

Method 1600 then proceeds to step 1625 with receiving an uplink transmission associated with the additional PCI, wherein the TA is applied to the uplink transmission. In some cases, the operations of this step refer to, or may be performed by, circuitry for receiving and/or code for receiving as described with reference to FIG. 18.

In some aspects, each PRACH configuration in the set indicates one or more of: an additional PCI, an additional PCI index, a generic RACH configuration, and a number of SSBs per RO.

In some aspects, the generic RACH configuration comprises one or more of a time domain position, a frequency domain position, a transmit power configuration, and a maximum number of random access preamble transmissions.

In some aspects, the method 1600 further includes receiving, at the serving cell PCI, a measurement report, wherein the measurement report includes measurement results based on a SSB associated with the additional PCI and the PDCCH order is transmitted after receiving the measurement report. In some cases, the operations of this step refer to, or may be performed by, circuitry for receiving and/or code for receiving as described with reference to FIG. 18.

In some aspects, the measurement results include one or more L1-RSRP measurements.

In some aspects, the PDCCH order indicates a RA preamble index, a SSB index, and a PRACH mask index.

In some aspects, the PDCCH order indicates the one PRACH configuration of the indicated set of PRACH configurations.

In some aspects, a RACH configuration is indicated using one or more reserved bits in the PDCCH order.

In some aspects, the additional PCI is associated with one or more active TCI states.

In some aspects, the additional PCI is not associated with any active TCI state.

In some aspects, the method 1600 further includes receiving, at a serving cell, UE capability information indicating that the UE is capable of supporting at least two TAs. In some cases, the operations of this step refer to, or may be performed by, circuitry for receiving and/or code for receiving as described with reference to FIG. 18.

In some aspects, the UE capability information additionally indicates that the UE is capable of supporting two TAs when the serving cell is configured with multiple CORESET pool index values and the serving cell is not configured with additional PCIs.

In some aspects, the UE capability information additionally indicates that the UE is capable of supporting two TAs when the serving cell is configured with multiple CORESET pool index values and one or more additional PCIs.

In some aspects, the UE capability information additionally indicates a first maximum number of PRACH configurations for additional PCIs and a second maximum number of PRACH configurations for additional PCIs.

In some aspects, the first maximum number is determined based on an assumption that each SSB configuration indicates an SSB time domain position and a periodicity of an additional PCI that is the same as an SSB time domain position and a periodicity of the serving cell PCI; and the second maximum number is determined based on an assumption that at least one SSB configuration indicates an SSB time domain position and a periodicity of the additional PCIs that is different from an SSB time domain position and a periodicity of the serving cell PCI.

Figure 18:
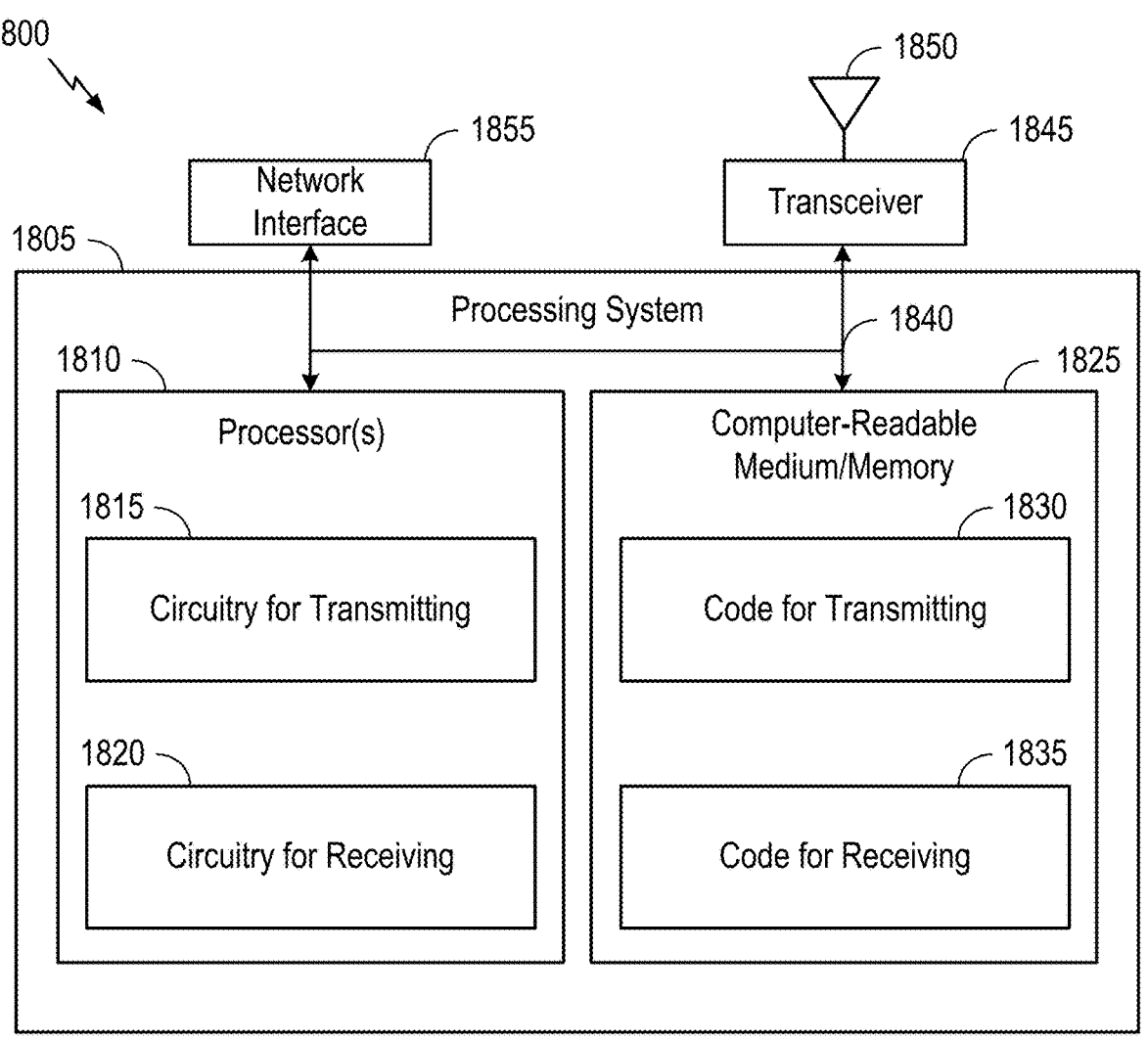
FIG. 18 depicts aspects of an example communications device.

In one aspect, method 1600, or any aspect related to it, may be performed by an apparatus, such as communications device 1800 of FIG. 18, which includes various components operable, configured, or adapted to perform the method 1600. Communications device 1800 is described below in further detail.

Note that FIG. 16 is just one example of a method, and other methods including fewer, additional, or alternative steps are possible consistent with this disclosure.

Example Communications Devices

FIG. 17 depicts aspects of an example communications device 1700. In some aspects, communications device 1700 is a user equipment, such as a UE 104 described above with respect to FIGS. 1 and 3.

The communications device 1700 includes a processing system 1705 coupled to the transceiver 1765 (e.g., a transmitter and/or a receiver). The transceiver 1765 is configured to transmit and receive signals for the communications device 1700 via the antenna 1770, such as the various signals as described herein. The processing system 1705 may be configured to perform processing functions for the communications device 1700, including processing signals received and/or to be transmitted by the communications device 1700.

The processing system 1705 includes one or more processors 1710. In various aspects, the one or more processors 1710 may be representative of one or more of receive processor 358, transmit processor 364, TX MIMO processor 366, and/or controller/processor 380, as described with respect to FIG. 3. The one or more processors 1710 are coupled to a computer-readable medium/memory 1735 via a bus 1760. In certain aspects, the computer-readable medium/memory 1735 is configured to store instructions (e.g., computer-executable code) that when executed by the one or more processors 1710, cause the one or more processors 1710 to perform the method 1500 described with respect to FIG. 15, or any aspect related to it. Note that reference to a processor performing a function of communications device 1700 may include one or more processors 1710 performing that function of communications device 1700.

In the depicted example, computer-readable medium/memory 1735 stores code (e.g., executable instructions), such as code for receiving 1740, code for transmitting 1745, code for applying 1750, and code for determining 1755. Processing of the code for receiving 1740, code for transmitting 1745, code for applying 1750, and code for determining 1755 may cause the communications device 1700 to perform the method 1500 described with respect to FIG. 15, or any aspect related to it.

The one or more processors 1710 include circuitry configured to implement (e.g., execute) the code stored in the computer-readable medium/memory 1735, including circuitry such as circuitry for receiving 1715, circuitry for transmitting 1720, circuitry for applying 1725, and circuitry for determining 1730. Processing with circuitry for receiving 1715, circuitry for transmitting 1720, circuitry for applying 1725, and circuitry for determining 1730 may cause the communications device 1700 to perform the method 1500 described with respect to FIG. 15, or any aspect related to it.

Various components of the communications device 1700 may provide means for performing the method 1500 described with respect to FIG. 15, or any aspect related to it. For example, means for transmitting, sending or outputting for transmission may include transceivers 354 and/or antenna(s) 352 of the UE 104 illustrated in FIG. 3 and/or the transceiver 1765 and the antenna 1770 of the communications device 1700 in FIG. 17. Means for receiving or obtaining may include transceivers 354 and/or antenna(s) 352 of the UE 104 illustrated in FIG. 3 and/or the transceiver 1765 and the antenna 1770 of the communications device 1700 in FIG. 17.

FIG. 18 depicts aspects of an example communications device 1800. In some aspects, communications device 1800 is a network entity, such as a BS 102 of FIGS. 1 and 3, or a disaggregated base station as discussed with respect to FIG. 2.

The communications device 1800 includes a processing system 1805 coupled to the transceiver 1845 (e.g., a transmitter and/or a receiver) and/or a network interface 1855. The transceiver 1845 is configured to transmit and receive signals for the communications device 1800 via the antenna 1850, such as the various signals as described herein. The network interface 1855 is configured to obtain and send signals for the communications device 1800 via communication link(s), such as a backhaul link, midhaul link, and/or fronthaul link as described herein, such as with respect to FIG. 2. The processing system 1805 may be configured to perform processing functions for the communications device 1800, including processing signals received and/or to be transmitted by the communications device 1800.

The processing system 1805 includes one or more processors 1810. In various aspects, one or more processors 1810 may be representative of one or more of receive processor 338, transmit processor 320, TX MIMO processor 330, and/or controller/processor 340, as described with respect to FIG. 3. The one or more processors 1810 are coupled to a computer-readable medium/memory 1825 via a bus 1840. In certain aspects, the computer-readable medium/memory 1825 is configured to store instructions (e.g., computer-executable code) that when executed by the one or more processors 1810, cause the one or more processors 1810 to perform the method 1600 described with respect to FIG. 16, or any aspect related to it. Note that reference to a processor of communications device 1800 performing a function may include one or more processors 1810 of communications device 1800 performing that function.

In the depicted example, the computer-readable medium/memory 1825 stores code (e.g., executable instructions), such as code for transmitting 1830 and code for receiving 1835. Processing of the code for transmitting 1830 and code for receiving 1835 may cause the communications device 1800 to perform the method 1600 described with respect to FIG. 16, or any aspect related to it.

The one or more processors 1810 include circuitry configured to implement (e.g., execute) the code stored in the computer-readable medium/memory 1825, including circuitry such as circuitry for transmitting 1815 and circuitry for receiving 1820. Processing with circuitry for transmitting 1815 and circuitry for receiving 1820 may cause the communications device 1800 to perform the method 1600 as described with respect to FIG. 16, or any aspect related to it.

Various components of the communications device 1800 may provide means for performing the method 1600 as described with respect to FIG. 16, or any aspect related to it. Means for transmitting, sending or outputting for transmission may include transceivers 332 and/or antenna(s) 334 of the BS 102 illustrated in FIG. 3 and/or the transceiver 1845 and the antenna 1850 of the communications device 1800 in FIG. 18. Means for receiving or obtaining may include transceivers 332 and/or antenna(s) 334 of the BS 102 illustrated in FIG. 3 and/or the transceiver 1845 and the antenna 1850 of the communications device 1800 in FIG. 18.

Example Clauses

Implementation examples are described in the following numbered clauses:

Clause 1: A method for wireless communication by a UE, comprising: receiving signaling indicating a set of PRACH configurations; receiving, a PDCCH order to trigger a PRACH transmission associated with an additional PCI different from a first PCI of a serving cell; transmitting a PRACH associated with the additional PCI based on one PRACH configuration of the set of PRACH configurations that is associated with the additional PCI; receiving an indication of a TA associated with the additional PCI; and applying the TA for an uplink transmission associated with the additional PCI.

Clause 2: The method of Clause 1, wherein each PRACH configuration in the set indicates one or more of: an additional PCI, an additional PCI index, a generic RACH configuration, and a number of SSBs per RO.

Clause 3: The method of Clause 2, wherein the generic RACH configuration comprises one or more of a time domain position, a frequency domain position, a transmit power configuration, and a maximum number of random access preamble transmissions.

Clause 4: The method of any one of Clauses 1-3, further comprising: transmitting a measurement report to the serving cell PCI, wherein the measurement report includes measurement results based on a SSB associated with the additional PCI and the PDCCH order is received after transmitting the measurement report.

Clause 5: The method of Clause 4, wherein the measurement results include one or more L1-RSRP measurements.

Clause 6: The method of any one of Clauses 1-5, wherein the PDCCH order indicates a RA preamble index, a SSB index, and a PRACH mask index.

Clause 7: The method of any one of Clauses 1-6, wherein the PDCCH order indicates the one PRACH configuration of the indicated set of PRACH configurations.

Clause 8: The method of Clause 7, wherein a RACH configuration is indicated using one or more reserved bits in the PDCCH order.

Clause 9: The method of Clause 7, further comprising: determining a transmit power for the PRACH transmission based on the PRACH configuration indicated in PDCCH order.

Clause 10: The method of any one of Clauses 1-9, wherein the additional PCI is associated with one or more active TCI states.

Clause 11: The method of any one of Clauses 1-10, wherein the additional PCI is not associated with any active TCI state.

Clause 12: The method of any one of Clauses 1-11, further comprising: transmitting, to a serving cell, UE capability information indicating that the UE is capable of supporting at least two TAs.

Clause 13: The method of Clause 12, wherein the UE capability information additionally indicates that the UE is capable of supporting two TAs when the serving cell is configured with multiple CORESET pool index values and the serving cell is not configured with additional PCIs.

Clause 14: The method of Clause 12, wherein the UE capability information additionally indicates that the UE is capable of supporting two TAs when the serving cell is configured with multiple CORESET pool index values and one or more additional PCIs.

Clause 15: The method of Clause 12, wherein the UE capability information additionally indicates a first maximum number of PRACH configurations for additional PCIs and a second maximum number of PRACH configurations for additional PCIs.

Clause 16: The method of Clause 15, wherein: the first maximum number is determined based on an assumption that each SSB configuration indicates an SSB time domain position and a periodicity of an additional PCI that is the same as an SSB time domain position and a periodicity of the serving cell PCI; and the second maximum number is determined based on an assumption that at least one SSB configuration indicates an SSB time domain position and a periodicity of the additional PCIs that is different from an SSB time domain position and a periodicity of the serving cell PCI.

Clause 17: A method for wireless communication by a network entity, comprising: transmitting signaling indicating a set of PRACH configurations; transmitting, a PDCCH order to trigger a PRACH transmission associated with an additional PCI different from a first PCI associated with a serving cell; receiving a PRACH associated with the additional PCI based on one PRACH configuration of the set of PRACH configurations that is associated with the additional PCI; transmitting an indication of a TA associated with the additional PCI; and receiving an uplink transmission associated with the additional PCI, wherein the TA is applied to the uplink transmission.

Clause 18: The method of Clause 17, wherein each PRACH configuration in the set indicates one or more of: an additional PCI, an additional PCI index, a generic RACH configuration, and a number of SSBs per RO.

Clause 19: The method of Clause 18, wherein the generic RACH configuration comprises one or more of a time domain position, a frequency domain position, a transmit power configuration, and a maximum number of random access preamble transmissions.

Clause 20: The method of any one of Clauses 17-19, further comprising: receiving, at the serving cell PCI, a measurement report, wherein the measurement report includes measurement results based on a SSB associated with the additional PCI and the PDCCH order is transmitted after receiving the measurement report.

Clause 21: The method of Clause 20, wherein the measurement results include one or more L1-RSRP measurements.

Clause 22: The method of any one of Clauses 17-21, wherein the PDCCH order indicates a RA preamble index, a SSB index, and a PRACH mask index.

Clause 23: The method of any one of Clauses 17-22, wherein the PDCCH order indicates the one PRACH configuration of the indicated set of PRACH configurations.

Clause 24: The method of Clause 23, wherein a RACH configuration is indicated using one or more reserved bits in the PDCCH order.

Clause 25: The method of any one of Clauses 17-24, wherein the additional PCI is associated with one or more active TCI states.

Clause 26: The method of any one of Clauses 17-25, wherein the additional PCI is not associated with any active TCI state.

Clause 27: The method of any one of Clauses 17-26, further comprising: receiving, at a serving cell, UE capability information indicating that the UE is capable of supporting at least two TAs.

Clause 28: The method of Clause 27, wherein the UE capability information additionally indicates that the UE is capable of supporting two TAs when the serving cell is configured with multiple CORESET pool index values and the serving cell is not configured with additional PCIs.

Clause 29: The method of Clause 27, wherein the UE capability information additionally indicates that the UE is capable of supporting two TAs when the serving cell is configured with multiple CORESET pool index values and one or more additional PCIs.

Clause 30: The method of Clause 27, wherein the UE capability information additionally indicates a first maximum number of PRACH configurations for additional PCIs and a second maximum number of PRACH configurations for additional PCIs.

Clause 31: The method of Clause 30, wherein: the first maximum number is determined based on an assumption that each SSB configuration indicates an SSB time domain position and a periodicity of an additional PCI that is the same as an SSB time domain position and a periodicity of the serving cell PCI; and the second maximum number is determined based on an assumption that at least one SSB configuration indicates an SSB time domain position and a periodicity of the additional PCIs that is different from an SSB time domain position and a periodicity of the serving cell PCI.

Clause 32: An apparatus, comprising: a memory comprising executable instructions; and a processor configured to execute the executable instructions and cause the apparatus to perform a method in accordance with any one of Clauses 1-31.

Clause 33: An apparatus, comprising means for performing a method in accordance with any one of Clauses 1-31.

Clause 34: A non-transitory computer-readable medium comprising executable instructions that, when executed by a processor of an apparatus, cause the apparatus to perform a method in accordance with any one of Clauses 1-31.

Clause 35: A computer program product embodied on a computer-readable storage medium comprising code for performing a method in accordance with any one of Clauses 1-31.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a user equipment (UE), comprising at least one memory comprising instructions; and one or more processors configured, individually or collectively, to execute the instructions to cause the apparatus to:
   receive signaling indicating a set of one or more physical random access channel (PRACH) configurations associated with one or more additional physical cell identifiers (PCIs) different from a serving cell PCI associated with a serving cell, wherein each PRACH configuration in the set indicates a number of synchronization signal blocks (SSBs) per random access channel (RACH) occasion (RO);
   receive a physical downlink control channel (PDCCH) order to trigger a PRACH transmission associated with an active additional PCI of the additional PCIs;
   transmit a PRACH associated with the active additional PCI based on one PRACH configuration of the set of PRACH configurations that is associated with the active additional PCI;
   receive an indication of a timing advance (TA) associated with the active additional PCI; and
   apply the TA for an uplink transmission associated with the active additional PCI.

2. The apparatus of claim 1, wherein each PRACH configuration in the set indicates one or more of:
   an additional PCI,
   an additional PCI index, or
   a generic RACH configuration.

3. The apparatus of claim 2, wherein the generic RACH configuration comprises one or more of a time domain position, a frequency domain position, a transmit power configuration, or a maximum number of random access preamble transmissions.

4. The apparatus of claim 1, wherein the one or more processors are further configured to execute the instructions to cause the apparatus to transmit a measurement report to the serving cell PCI, wherein the measurement report includes measurement results based on a synchronization signal block (SSB) associated with the active additional PCI and the PDCCH order is received after transmitting the measurement report.

5. The apparatus of claim 4, wherein the measurement results include one or more layer 1 (L1)-reference signal received power (L1-RSRP) measurements.

6. The apparatus of claim 1, wherein the PDCCH order indicates a random access (RA) preamble index, a synchronization signal block (SSB) index, and a PRACH mask index.

7. The apparatus of claim 1, wherein the PDCCH order indicates the one PRACH configuration of the indicated set of PRACH configurations.

8. The apparatus of claim 7, wherein a random access channel (RACH) configuration is indicated using one or more reserved bits in the PDCCH order.

9. The apparatus of claim 7, wherein the one or more processors are further configured to execute the executable instructions to cause the apparatus to determine a transmit power for the PRACH transmission based on the PRACH configuration indicated in PDCCH order.

10. The apparatus of claim 1, wherein the active additional PCI is associated with one or more active TCI states.

11. The apparatus of claim 1, wherein the active additional PCI is not associated with any active TCI state.

12. The apparatus of claim 1, wherein the one or more processors are further configured to execute the executable instructions to cause the apparatus to transmit, to a serving cell, UE capability information indicating that the UE is capable of supporting at least two timing advances (TAs).

13. The apparatus of claim 12, wherein the UE capability information additionally indicates that the UE is capable of supporting two timing advances (TAs) when the serving cell is configured with multiple control resource set (CORESET) pool index values and the serving cell is not configured with additional PCIs.

14. The apparatus of claim 12, wherein the UE capability information additionally indicates that the UE is capable of supporting two timing advances (TAs) when the serving cell is configured with multiple CORESET pool index values and one or more additional PCIs.

15. The apparatus of claim 12, wherein the UE capability information additionally indicates a first maximum number of PRACH configurations for additional PCIs and a second maximum number of PRACH configurations for additional PCIs.

16. The apparatus of claim 15, wherein:
   the first maximum number is determined based on an assumption that each SSB configuration indicates an SSB time domain position and a periodicity of an additional PCI that is the same as an SSB time domain position and a periodicity of the serving cell PCI; and
   the second maximum number is determined based on an assumption that at least one SSB configuration indicates an SSB time domain position and a periodicity of the additional PCIs that is different from an SSB time domain position and a periodicity of the serving cell PCI.

17. An apparatus for wireless communication at a network entity, comprising at least one memory comprising instructions; and one or more processors configured, individually or collectively, to execute the instructions to cause the apparatus to:
   transmit signaling indicating a set of one or more physical random access channel (PRACH) configurations associated with one or more additional physical cell identifiers (PCIs) different from a first PCI associated with a serving cell, wherein each PRACH configuration in the set indicates a number of synchronization signal blocks (SSBs) per random access channel (RACH) occasion (RO);
   transmit, to a user equipment (UE), a physical downlink control channel (PDCCH) order to trigger a PRACH transmission associated with an active additional PCI of the additional PCIs;
   receive a PRACH associated with the active additional PCI based on one PRACH configuration of the set of PRACH configurations that is associated with the active additional PCI;
   transmit an indication of a timing advance (TA) associated with the active additional PCI; and
   receive an uplink transmission associated with the active additional PCI.

18. The apparatus of claim 17, wherein the PDCCH order indicates the one PRACH configuration of the indicated set of PRACH configurations.

19. The apparatus of claim 17, wherein the one or more processors are further configured to execute the executable instructions to cause the apparatus to receive UE capability information indicating that the UE is capable of supporting at least two timing advances (TAs).

20. A method for wireless communication at a user equipment (UE), comprising:

receiving signaling indicating a set of one or more physical random access channel (PRACH) configurations associated with one or more additional physical cell identifiers (PCIs) different from a first PCI associated with a serving cell, wherein each PRACH configuration in the set indicates a number of synchronization signal blocks (SSBs) per random access channel (RACH) occasion (RO);

receiving a physical downlink control channel (PDCCH) order to trigger a PRACH transmission associated with an active additional PCI of the additional PCIs;

transmitting a PRACH associated with the active additional PCI based on one PRACH configuration of the set of PRACH configurations that is associated with the additional PCI;

receiving an indication of a timing advance (TA) associated with the active additional PCI; and applying the TA for an uplink transmission associated with the active additional PCI.

* * * * *